(12) United States Patent
Petrisor et al.

(10) Patent No.: US 9,036,487 B2
(45) Date of Patent: May 19, 2015

(54) SERIAL NETWORKING FIBER OPTIC INFLIGHT ENTERTAINMENT SYSTEM NETWORK CONFIGURATION

(71) Applicant: Lumexis Corporation, Irvine, CA (US)

(72) Inventors: Gregory C. Petrisor, Los Angeles, CA (US); Timotheus Antonius Beuman, Chino Hills, CA (US); Allen Curtis, Mission Viejo, CA (US)

(73) Assignee: Lumexis Corporation, Irvine, CA (US)

( * ) Notice: Subject to any disclaimer, the term of this patent is extended or adjusted under 35 U.S.C. 154(b) by 45 days.

(21) Appl. No.: 13/685,525

(22) Filed: Nov. 26, 2012

(65) Prior Publication Data

US 2013/0083696 A1  Apr. 4, 2013

Related U.S. Application Data

(63) Continuation of application No. 12/860,437, filed on Aug. 20, 2010, now Pat. No. 8,416,698.

(60) Provisional application No. 61/274,726, filed on Aug. 20, 2009.

(51) Int. Cl.
*G06F 11/10* (2006.01)
*H04L 12/24* (2006.01)
(Continued)

(52) U.S. Cl.
CPC ............ *H04L 41/12* (2013.01); *B64D 11/0015* (2013.01); *H04N 7/22* (2013.01); *H04Q 11/0062* (2013.01); *H04Q 11/0066* (2013.01); *H04Q 2011/0092* (2013.01)

(58) Field of Classification Search
CPC ............ H04L 67/1042; H04L 67/1044; H04L 67/1048; H04L 67/1053; H04L 67/12; H04L 67/125; H04L 12/40078; H04L 12/40123; H04L 12/40117; H04L 12/40169; H04L 12/42; H04L 12/437; H04L 41/0806; H04L 41/0813; H04L 41/12; H04L 41/14; H04L 45/02; H04L 45/08; H04L 45/18; H04L 45/20
USPC .................................................. 370/217–228
See application file for complete search history.

(56) References Cited

U.S. PATENT DOCUMENTS 3,964,826 A   6/1976   Joseph et al.
4,337,909 A   7/1982   Harja
(Continued)

FOREIGN PATENT DOCUMENTS

CN   1048478   1/1991
EP   1469652   10/2004
(Continued)

OTHER PUBLICATIONS

Chinese First Office Action re App. No. 200680034350.3, dated Jul. 10, 2009.
(Continued)

*Primary Examiner* — Alvin Zhu
(74) *Attorney, Agent, or Firm* — Knobbe, Martens, Olson & Bear, LLP

(57) ABSTRACT

Serial networking dedicated fiber optic inflight entertainment (IFE) systems, methods therefor and components thereof, that exhibit improved configuration and failover attributes through implementation of novel network configuration protocols. In some aspects of the invention, such an IFE system comprises a plurality of head end line replaceable units (HE-LRUs) and a plurality of serial networking line replaceable units (SN-LRUs), wherein each of the SN-LRUs individually detects that a closed system network has been formed between the plurality of HE-LRUs and the plurality of SNL-RUs based on a plurality of packets sourced by at least one of the HE-LRUs and received on a plurality of ports of each of the SN-LRUs, and wherein in response to detecting that the closed system network has been formed one of the SN-LRUs blocks one of its ports based on further detecting that the SN-LRU is a middle SN-LRU.

18 Claims, 11 Drawing Sheets

(51) Int. Cl.
*H04N 7/22* (2006.01)
*H04Q 11/00* (2006.01)
*B64D 11/00* (2006.01)

(56) References Cited

U.S. PATENT DOCUMENTS

| | | |
|---|---|---|
| 4,408,144 A | 10/1983 | Lukes |
| 4,433,301 A | 2/1984 | Lukes |
| 4,433,344 A | 2/1984 | Gradin et al. |
| 4,467,381 A | 8/1984 | Harja |
| 4,577,191 A | 3/1986 | Pargee, Jr. |
| 4,639,106 A | 1/1987 | Gradin |
| 4,827,252 A | 5/1989 | Busbridge et al. |
| 4,828,378 A | 5/1989 | Ellis |
| 4,832,449 A | 5/1989 | Mundy et al. |
| 4,833,333 A | 5/1989 | Rand |
| 4,833,337 A | 5/1989 | Kelley et al. |
| 4,894,818 A | 1/1990 | Fujioka et al. |
| 4,903,017 A | 2/1990 | Wooler |
| 4,946,129 A | 8/1990 | Eastwick |
| 4,952,809 A | 8/1990 | McEwen |
| 4,958,381 A | 9/1990 | Toyoshima |
| 4,969,724 A | 11/1990 | Ellis |
| 4,993,788 A | 2/1991 | Steward |
| 4,994,794 A | 2/1991 | Price et al. |
| 5,007,699 A | 4/1991 | Stout |
| 5,014,342 A | 5/1991 | Pudsey |
| 5,056,737 A | 10/1991 | Taylor |
| 5,059,781 A | 10/1991 | Langdon |
| 5,076,524 A | 12/1991 | Reh et al. |
| 5,093,567 A | 3/1992 | Staveley |
| 5,096,271 A | 3/1992 | Portman |
| 5,121,702 A | 6/1992 | Johnson et al. |
| 5,123,728 A | 6/1992 | Gradin et al. |
| 5,132,527 A | 7/1992 | Karpati |
| 5,150,122 A | 9/1992 | Bell |
| 5,179,447 A | 1/1993 | Lain |
| 5,181,013 A | 1/1993 | Bagshaw et al. |
| 5,181,771 A | 1/1993 | Robak et al. |
| 5,184,231 A | 2/1993 | Ellis |
| 5,200,757 A | 4/1993 | Jairam |
| 5,203,220 A | 4/1993 | Lerman |
| 5,208,938 A | 5/1993 | Webb |
| 5,210,409 A | 5/1993 | Rowe |
| 5,220,456 A | 6/1993 | Haessig, Jr. |
| 5,222,780 A | 6/1993 | Reh et al. |
| 5,262,762 A | 11/1993 | Westover et al. |
| 5,267,775 A | 12/1993 | Nguyen |
| 5,289,196 A | 2/1994 | Gans et al. |
| 5,307,206 A | 4/1994 | Haessig, Jr. |
| 5,311,302 A | 5/1994 | Berry et al. |
| 5,333,002 A | 7/1994 | Gans et al. |
| 5,341,140 A | 8/1994 | Perry |
| 5,344,210 A | 9/1994 | Marwan et al. |
| 5,353,109 A | 10/1994 | Langdon et al. |
| 5,369,355 A | 11/1994 | Roe |
| 5,374,103 A | 12/1994 | Stange et al. |
| 5,398,991 A | 3/1995 | Smith et al. |
| 5,400,079 A | 3/1995 | Martinez et al. |
| 5,421,530 A | 6/1995 | Bertagna et al. |
| 5,440,337 A | 8/1995 | Henderson et al. |
| 5,442,556 A | 8/1995 | Boyes et al. |
| 5,467,106 A | 11/1995 | Salomon |
| 5,481,868 A | 1/1996 | Davies et al. |
| 5,517,508 A | 5/1996 | Scott |
| 5,523,551 A | 6/1996 | Scott |
| 5,529,265 A | 6/1996 | Sakurai |
| 5,535,884 A | 7/1996 | Scott et al. |
| 5,539,560 A | 7/1996 | Dennis et al. |
| 5,539,657 A | 7/1996 | Utsumi et al. |
| 5,543,818 A | 8/1996 | Scott |
| 5,548,356 A | 8/1996 | Portman |
| 5,568,484 A | 10/1996 | Margis |
| 5,574,497 A | 11/1996 | Henderson et al. |
| 5,577,205 A | 11/1996 | Hwang et al. |
| 5,583,674 A | 12/1996 | Mosley |
| 5,596,647 A | 1/1997 | Wakai et al. |
| 5,601,208 A | 2/1997 | Scott |
| 5,636,055 A | 6/1997 | Portman et al. |
| 5,638,236 A | 6/1997 | Scott |
| 5,640,297 A | 6/1997 | Labaze |
| 5,641,092 A | 6/1997 | Scott |
| 5,647,505 A | 7/1997 | Scott |
| 5,648,904 A | 7/1997 | Scott |
| 5,666,291 A | 9/1997 | Scott et al. |
| 5,675,752 A | 10/1997 | Scott et al. |
| 5,704,798 A | 1/1998 | Portman et al. |
| 5,705,860 A | 1/1998 | Ninh et al. |
| 5,731,782 A | 3/1998 | Walls |
| 5,738,392 A | 4/1998 | Portman |
| 5,786,801 A | 7/1998 | Ichise |
| 5,786,917 A | 7/1998 | Maeno |
| 5,790,787 A | 8/1998 | Scott et al. |
| 5,793,330 A | 8/1998 | Gans et al. |
| 5,796,185 A | 8/1998 | Takata et al. |
| 5,801,749 A | 9/1998 | Ninh et al. |
| 5,805,821 A | 9/1998 | Wang et al. |
| 5,811,791 A | 9/1998 | Portman |
| 5,812,778 A | 9/1998 | Peters et al. |
| 5,813,048 A | 9/1998 | Thom |
| 5,826,091 A | 10/1998 | Shah et al. |
| 5,831,805 A | 11/1998 | Sekine et al. |
| 5,832,279 A | 11/1998 | Rostoker et al. |
| 5,835,127 A | 11/1998 | Booth et al. |
| 5,838,802 A | 11/1998 | Swinbanks |
| 5,847,522 A | 12/1998 | Barba |
| 5,848,235 A | 12/1998 | Scott et al. |
| 5,848,367 A | 12/1998 | Lotocky et al. |
| 5,854,591 A | 12/1998 | Atkinson |
| 5,857,869 A | 1/1999 | Parcel et al. |
| 5,859,616 A | 1/1999 | Gans et al. |
| 5,871,173 A | 2/1999 | Frank et al. |
| 5,872,934 A | 2/1999 | Whitehouse et al. |
| 5,881,228 A | 3/1999 | Atkinson et al. |
| 5,884,096 A | 3/1999 | Seifert et al. |
| 5,889,466 A | 3/1999 | Ferguson |
| 5,889,775 A | 3/1999 | Sawicz et al. |
| 5,892,478 A | 4/1999 | Moss |
| 5,894,413 A | 4/1999 | Ferguson |
| 5,896,129 A | 4/1999 | Murphy et al. |
| 5,898,401 A | 4/1999 | Walls |
| 5,907,827 A | 5/1999 | Fang et al. |
| 5,910,814 A | 6/1999 | Portman et al. |
| 5,910,966 A | 6/1999 | Sekine et al. |
| 5,914,576 A | 6/1999 | Barba |
| 5,920,186 A | 7/1999 | Ninh et al. |
| 5,923,673 A | 7/1999 | Henrikson |
| 5,923,743 A | 7/1999 | Sklar |
| 5,926,759 A | 7/1999 | Severwright |
| 5,929,895 A | 7/1999 | Berry et al. |
| 5,939,997 A | 8/1999 | Sekine et al. |
| 5,942,811 A | 8/1999 | Stumfall et al. |
| 5,944,803 A | 8/1999 | Whitehouse |
| 5,945,631 A | 8/1999 | Henrikson et al. |
| 5,953,429 A | 9/1999 | Wakai et al. |
| 5,957,798 A | 9/1999 | Smith, III et al. |
| 5,963,877 A | 10/1999 | Kobayashi |
| 5,973,722 A | 10/1999 | Wakai et al. |
| 5,978,736 A | 11/1999 | Greendale |
| 5,986,810 A | 11/1999 | Webb |
| 5,991,138 A | 11/1999 | Sklar et al. |
| 5,999,520 A | 12/1999 | Little |
| 6,008,779 A | 12/1999 | Ellis |
| 6,011,322 A | 1/2000 | Stumfall et al. |
| 6,014,381 A | 1/2000 | Troxel et al. |
| 6,031,299 A | 2/2000 | Stumfall et al. |
| 6,034,688 A | 3/2000 | Greenwood et al. |
| 6,038,426 A | 3/2000 | Williams, Jr. |
| 6,052,426 A | 4/2000 | Maurice |
| 6,055,634 A | 4/2000 | Severwright |
| 6,057,875 A | 5/2000 | Ferguson et al. |
| 6,058,288 A | 5/2000 | Reed et al. |
| 6,092,868 A | 7/2000 | Wynn |
| 6,110,261 A | 8/2000 | Guiragossian |

(56) References Cited

U.S. PATENT DOCUMENTS

| | | |
|---|---|---|
| 6,130,636 A | 10/2000 | Severwright |
| 6,131,119 A | 10/2000 | Fukui |
| 6,134,674 A | 10/2000 | Akasheh |
| 6,154,910 A | 12/2000 | Corney |
| 6,157,471 A | 12/2000 | Bignolles et al. |
| 6,160,591 A | 12/2000 | Stumfall et al. |
| 6,163,823 A | 12/2000 | Henrikson |
| 6,185,643 B1 | 2/2001 | Asprey et al. |
| 6,189,127 B1 | 2/2001 | Fang et al. |
| 6,195,040 B1 | 2/2001 | Arethens |
| 6,208,307 B1 | 3/2001 | Frisco et al. |
| 6,249,913 B1 | 6/2001 | Galipeau et al. |
| 6,266,736 B1 | 7/2001 | Atkinson et al. |
| 6,266,815 B1 | 7/2001 | Shen et al. |
| 6,272,572 B1 | 8/2001 | Backhaus et al. |
| 6,310,286 B1 | 10/2001 | Troxel et al. |
| 6,359,608 B1 | 3/2002 | Lebrun et al. |
| 6,366,311 B1 | 4/2002 | Monroe |
| 6,373,216 B1 | 4/2002 | Ho |
| 6,390,920 B1 | 5/2002 | Infiesto et al. |
| 6,452,155 B1 | 9/2002 | Sherlock et al. |
| 6,453,259 B1 | 9/2002 | Infiesto |
| 6,453,267 B1 | 9/2002 | Rudzik et al. |
| 6,457,837 B1 | 10/2002 | Steffensmeier |
| 6,466,258 B1 | 10/2002 | Mogenis et al. |
| 6,477,152 B1 | 11/2002 | Hiett |
| 6,490,510 B1 | 12/2002 | Choiset |
| 6,493,147 B1 | 12/2002 | Baudou et al. |
| 6,499,027 B1 | 12/2002 | Weinberger |
| 6,507,952 B1 | 1/2003 | Miller et al. |
| 6,520,015 B1 | 2/2003 | Alause et al. |
| 6,529,706 B1 | 3/2003 | Mitchell |
| 6,535,490 B1 | 3/2003 | Jain |
| D473,233 S | 4/2003 | Politzer |
| 6,549,754 B1 | 4/2003 | Miller et al. |
| 6,556,114 B1 | 4/2003 | Guillemin et al. |
| 6,559,812 B1 | 5/2003 | McCarten et al. |
| 6,561,006 B1 | 5/2003 | Roberge et al. |
| 6,588,117 B1 | 7/2003 | Martin et al. |
| 6,611,311 B1 | 8/2003 | Kretz et al. |
| 6,612,870 B1 | 9/2003 | Rauscent |
| 6,614,126 B1 | 9/2003 | Mitchell |
| 6,633,156 B1 | 10/2003 | Choisnet |
| 6,654,806 B2 | 11/2003 | Wall et al. |
| 6,661,353 B1 | 12/2003 | Gopen |
| 6,661,664 B2 | 12/2003 | Sarno et al. |
| 6,679,112 B2 | 1/2004 | Collot et al. |
| 6,681,250 B1 | 1/2004 | Thomas et al. |
| 6,698,281 B1 | 3/2004 | Choisnet |
| 6,715,150 B1 | 4/2004 | Potin |
| 6,731,639 B1 | 5/2004 | Ors et al. |
| 6,735,309 B1 | 5/2004 | Lemanski et al. |
| 6,741,841 B1 | 5/2004 | Mitchell |
| 6,754,609 B2 | 6/2004 | Lescourret |
| 6,756,304 B1 | 6/2004 | Robert |
| 6,775,462 B1 | 8/2004 | Wang et al. |
| 6,782,392 B1 | 8/2004 | Weinberger et al. |
| 6,801,769 B1 | 10/2004 | Royalty |
| 6,806,885 B1 | 10/2004 | Piper et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,811,348 B1 | 11/2004 | Meyer et al. |
| 6,812,992 B2 | 11/2004 | Nemeth |
| 6,813,777 B1 | 11/2004 | Weinberger et al. |
| 6,815,716 B2 | 11/2004 | Sanson et al. |
| 6,817,240 B2 | 11/2004 | Collot et al. |
| 6,822,812 B1 | 11/2004 | Brauer |
| 6,824,317 B2 | 11/2004 | Finizio et al. |
| D499,402 S | 12/2004 | Boyer et al. |
| 6,844,874 B2 | 1/2005 | Maurice |
| 6,845,658 B2 | 1/2005 | Roberge et al. |
| D503,707 S | 4/2005 | Boyer, Jr. |
| 6,876,905 B2 | 4/2005 | Farley et al. |
| 6,894,490 B2 | 5/2005 | Lescourret |
| 6,899,390 B2 | 5/2005 | Sanfrod et al. |
| D506,733 S | 6/2005 | Boyer, Jr. |
| 6,918,294 B1 | 7/2005 | Roberge |
| 6,919,874 B1 | 7/2005 | Maurice |
| 6,920,461 B2 | 7/2005 | Hejlsberg |
| 6,924,785 B1 | 8/2005 | Kretz et al. |
| 6,937,194 B1 | 8/2005 | Meier et al. |
| 6,938,258 B1 | 8/2005 | Weinberger et al. |
| 6,956,680 B2 | 10/2005 | Morvieu et al. |
| 6,972,747 B2 | 12/2005 | Bayot et al. |
| 6,973,479 B2 | 12/2005 | Brady, Jr. et al. |
| 6,977,638 B1 | 12/2005 | Bayot et al. |
| 7,028,304 B1 | 4/2006 | Weinberger et al. |
| 7,040,697 B1 | 5/2006 | Tuccinardi et al. |
| 7,042,528 B2 | 5/2006 | Lester et al. |
| 7,068,712 B1 | 6/2006 | Zang et al. |
| 7,076,724 B2 | 7/2006 | Cole et al. |
| 7,088,525 B2 | 8/2006 | Finizio et al. |
| 7,090,128 B2 | 8/2006 | Farley et al. |
| 7,102,691 B2 | 9/2006 | Dischert et al. |
| 7,113,978 B2 | 9/2006 | Beasley et al. |
| 7,114,171 B2 | 9/2006 | Brady et al. |
| 7,124,426 B1 | 10/2006 | Tsuria et al. |
| 7,177,638 B2 | 2/2007 | Funderburk et al. |
| 7,187,498 B2 | 3/2007 | Bengoechea et al. |
| 7,199,396 B2 | 4/2007 | Lebrun |
| 7,200,229 B2 | 4/2007 | Spring et al. |
| 7,213,055 B1 | 5/2007 | Kathol |
| 7,216,296 B1 | 5/2007 | Broberg et al. |
| 7,221,650 B1 | 5/2007 | Cooper et al. |
| 7,236,488 B1 | 6/2007 | Kavipurapu |
| 7,249,167 B1 | 7/2007 | Liaw et al. |
| 7,269,761 B2 | 9/2007 | Yi |
| 7,280,134 B1 | 10/2007 | Henderson et al. |
| 7,280,825 B2 | 10/2007 | Keen et al. |
| 7,286,289 B2 | 10/2007 | Bengoechea et al. |
| 7,289,499 B1 | 10/2007 | Chinn et al. |
| 7,330,649 B2 | 2/2008 | Finizio et al. |
| 7,337,043 B2 | 2/2008 | Bull |
| 7,343,157 B1 | 3/2008 | Mitchell |
| 7,344,102 B1 | 3/2008 | Royer et al. |
| D566,032 S | 4/2008 | Berthou et al. |
| 7,352,929 B2 | 4/2008 | Hagen et al. |
| 7,403,780 B2 | 7/2008 | VanLaningham et al. |
| 7,405,773 B2 | 7/2008 | Lester et al. |
| 7,438,511 B2 | 10/2008 | Legeay |
| 7,483,382 B1 | 1/2009 | Toillon et al. |
| 7,483,696 B1 | 1/2009 | Mitchell |
| 7,486,960 B2 | 2/2009 | Brady, Jr. et al. |
| 7,487,938 B2 | 2/2009 | Brady, Jr. et al. |
| 7,496,361 B1 | 2/2009 | Mitchell et al. |
| 7,565,143 B2 | 7/2009 | Takeuchi et al. |
| 7,566,254 B2 | 7/2009 | Sampica et al. |
| 7,580,528 B2 | 8/2009 | Farley et al. |
| 7,587,733 B2 | 9/2009 | Keen et al. |
| 7,587,734 B2 | 9/2009 | Logan et al. |
| 7,599,691 B1 | 10/2009 | Mitchell |
| 7,600,248 B1 | 10/2009 | Berry |
| 7,619,422 B2 | 11/2009 | Tsamis et al. |
| 7,620,364 B2 | 11/2009 | Higashida et al. |
| 7,621,770 B1 | 11/2009 | Finizio et al. |
| 7,628,357 B2 | 12/2009 | Mercier et al. |
| D607,800 S | 1/2010 | Canal et al. |
| D607,801 S | 1/2010 | Canal et al. |
| 7,642,974 B2 | 1/2010 | Brady, Jr. et al. |
| 7,649,696 B2 | 1/2010 | Finizio et al. |
| 7,675,849 B2 | 3/2010 | Watson et al. |
| 7,676,225 B2 | 3/2010 | Funderburk et al. |
| 7,680,092 B2 | 3/2010 | VanLaningham et al. |
| 7,715,783 B2 | 5/2010 | Girard et al. |
| 7,725,569 B2 | 5/2010 | Brady, Jr. et al. |
| 7,792,189 B2 | 9/2010 | Finizio et al. |
| 7,808,891 B2 | 10/2010 | Law et al. |
| 7,830,781 B2 | 11/2010 | Zogg et al. |
| 7,836,472 B2 | 11/2010 | Brady, Jr. et al. |
| 7,843,554 B2 | 11/2010 | Koenck et al. |
| 7,859,995 B2 | 12/2010 | Bejerano et al. |
| 7,876,688 B2 | 1/2011 | Hauenstein et al. |
| 8,184,974 B2 | 5/2012 | Cline |

(56) References Cited

U.S. PATENT DOCUMENTS

| | | |
|---|---|---|
| 8,416,698 B2 | 4/2013 | Petrisor et al. |
| 8,424,045 B2 | 4/2013 | Petrisor |
| 8,659,990 B2 | 2/2014 | Petrisor et al. |
| 2002/0045484 A1 | 4/2002 | Eck et al. |
| 2002/0046300 A1 | 4/2002 | Hanko et al. |
| 2002/0063924 A1 | 5/2002 | Kimbrough et al. |
| 2002/0180904 A1 | 12/2002 | Lauzun et al. |
| 2003/0016806 A1 | 1/2003 | Emerson |
| 2003/0021241 A1 | 1/2003 | Dame et al. |
| 2003/0025599 A1 | 2/2003 | Monroe |
| 2003/0033459 A1 | 2/2003 | Garnett |
| 2003/0060156 A1 | 3/2003 | Giaccherini et al. |
| 2003/0064714 A1 | 4/2003 | Sanford et al. |
| 2003/0085818 A1 | 5/2003 | Renton et al. |
| 2003/0088360 A1 | 5/2003 | Ikhlef et al. |
| 2003/0093798 A1 | 5/2003 | Rogerson |
| 2003/0107248 A1 | 6/2003 | Sanford et al. |
| 2003/0110466 A1 | 6/2003 | Dricot et al. |
| 2003/0110509 A1 | 6/2003 | Levinson et al. |
| 2003/0149983 A1 | 8/2003 | Markel |
| 2003/0184957 A1 | 10/2003 | Stahl et al. |
| 2003/0217363 A1 | 11/2003 | Brady et al. |
| 2004/0052372 A1 | 3/2004 | Jakoubek |
| 2004/0081083 A1 | 4/2004 | Sekihata |
| 2004/0105459 A1 | 6/2004 | Mannam |
| 2004/0217976 A1 | 11/2004 | Sanford |
| 2004/0235469 A1 | 11/2004 | Krug |
| 2005/0005225 A1 | 1/2005 | Johnson et al. |
| 2005/0044186 A1 | 2/2005 | Petrisor |
| 2005/0044564 A1 | 2/2005 | Stopniewicz et al. |
| 2005/0053237 A1 | 3/2005 | Hanson |
| 2005/0055228 A1 | 3/2005 | Boyer et al. |
| 2005/0055278 A1 | 3/2005 | Boyer |
| 2005/0132407 A1 | 6/2005 | Boyer, Jr. et al. |
| 2005/0152289 A1 | 7/2005 | Nagata et al. |
| 2005/0177763 A1 | 8/2005 | Stoler |
| 2005/0193257 A1 | 9/2005 | Stoler |
| 2005/0200697 A1 | 9/2005 | Schedivy et al. |
| 2005/0216938 A1 | 9/2005 | Brady, Jr. et al. |
| 2005/0256616 A1 | 11/2005 | Rhoads |
| 2005/0268319 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2006/0107295 A1 | 5/2006 | Margis et al. |
| 2006/0143660 A1 | 6/2006 | Logan et al. |
| 2006/0143661 A1 | 6/2006 | Funderburk et al. |
| 2006/0143662 A1 | 6/2006 | Esterling et al. |
| 2006/0174285 A1 | 8/2006 | Brady, Jr. et al. |
| 2006/0179457 A1 | 8/2006 | Brady, Jr. et al. |
| 2006/0184583 A1 | 8/2006 | Renton et al. |
| 2006/0194575 A1 | 8/2006 | Stadelmeier et al. |
| 2006/0277589 A1 | 12/2006 | Margis et al. |
| 2006/0291803 A1 | 12/2006 | Watson et al. |
| 2007/0044126 A1 | 2/2007 | Mitchell |
| 2007/0060063 A1 | 3/2007 | Wright et al. |
| 2007/0077998 A1 | 4/2007 | Petrisor |
| 2007/0130591 A1 | 6/2007 | Brady, Jr. et al. |
| 2007/0164609 A1 | 7/2007 | Shalam et al. |
| 2007/0280199 A1 | 12/2007 | Rong |
| 2007/0292108 A1 | 12/2007 | Reichert et al. |
| 2007/0294732 A1 | 12/2007 | Brady et al. |
| 2008/0023600 A1 | 1/2008 | Perlman |
| 2008/0040756 A1 | 2/2008 | Perlman et al. |
| 2008/0050512 A1 | 2/2008 | Lower et al. |
| 2008/0056178 A1 | 3/2008 | Alexander et al. |
| 2008/0089658 A1 | 4/2008 | Grady et al. |
| 2008/0105784 A1 | 5/2008 | Barroca |
| 2008/0142585 A1 | 6/2008 | Foreman et al. |
| 2008/0157997 A1 | 7/2008 | Bleacher et al. |
| 2008/0159174 A1 | 7/2008 | Enomoto et al. |
| 2008/0187282 A1 | 8/2008 | Brady et al. |
| 2008/0189748 A1 | 8/2008 | Bleacher et al. |
| 2008/0237440 A1 | 10/2008 | Lester et al. |
| 2008/0240029 A1 | 10/2008 | Lynch et al. |
| 2008/0240038 A1 | 10/2008 | Lynch et al. |
| 2008/0240061 A1 | 10/2008 | Lynch et al. |
| 2008/0240062 A1 | 10/2008 | Lynch et al. |
| 2008/0244664 A1 | 10/2008 | Hong et al. |
| 2008/0259023 A1 | 10/2008 | Chang |
| 2008/0285459 A1 | 11/2008 | Diab et al. |
| 2008/0310609 A1 | 12/2008 | Brady, Jr. et al. |
| 2008/0312778 A1 | 12/2008 | Correa et al. |
| 2008/0313259 A1 | 12/2008 | Correa et al. |
| 2009/0007193 A1 | 1/2009 | Correa et al. |
| 2009/0007194 A1 | 1/2009 | Brady, Jr. et al. |
| 2009/0034540 A1 | 2/2009 | Law |
| 2009/0068474 A1 | 3/2009 | Lower et al. |
| 2009/0077595 A1 | 3/2009 | Sizelove et al. |
| 2009/0079705 A1 | 3/2009 | Sizelove et al. |
| 2009/0081947 A1 | 3/2009 | Margis |
| 2009/0083805 A1 | 3/2009 | Sizelove et al. |
| 2009/0094635 A1 | 4/2009 | Aslin et al. |
| 2009/0096857 A1 | 4/2009 | Frisco et al. |
| 2009/0100476 A1 | 4/2009 | Frisco et al. |
| 2009/0119721 A1 | 5/2009 | Perlman et al. |
| 2009/0202241 A1 | 8/2009 | Yu et al. |
| 2009/0228908 A1 | 9/2009 | Margis et al. |
| 2009/0243352 A1 | 10/2009 | Cailleteau |
| 2009/0246355 A9 | 10/2009 | Lower et al. |
| 2009/0262290 A1 | 10/2009 | Sampica et al. |
| 2009/0279257 A1 | 11/2009 | Lower et al. |
| 2009/0282469 A1 | 11/2009 | Lynch et al. |
| 2010/0008503 A1 | 1/2010 | Farley et al. |
| 2010/0013279 A1 | 1/2010 | Cailleteau |
| 2010/0027461 A1 | 2/2010 | Bothorel |
| 2010/0028019 A1 | 2/2010 | Yu et al. |
| 2010/0032999 A1 | 2/2010 | Petitpierre |
| 2010/0060739 A1 | 3/2010 | Salazar |
| 2010/0064327 A1 | 3/2010 | Lynch et al. |
| 2010/0066616 A1 | 3/2010 | Brady, Jr. et al. |
| 2010/0088731 A1 | 4/2010 | Vanyek |
| 2010/0098418 A1 | 4/2010 | Bouet et al. |
| 2010/0138581 A1 | 6/2010 | Bird et al. |
| 2010/0138582 A1 | 6/2010 | Bird et al. |
| 2010/0138879 A1 | 6/2010 | Bird et al. |
| 2010/0144267 A1 | 6/2010 | Funderburk et al. |
| 2010/0152962 A1 | 6/2010 | Bennett et al. |
| 2010/0180299 A1 | 7/2010 | Girard et al. |
| 2010/0189089 A1 | 7/2010 | Lynch et al. |
| 2010/0195634 A1 | 8/2010 | Thompson |
| 2010/0199196 A1 | 8/2010 | Thompson |
| 2010/0205333 A1 | 8/2010 | Francois et al. |
| 2011/0003505 A1 | 1/2011 | Greig et al. |
| 2011/0063998 A1 | 3/2011 | Petrisor et al. |
| 2011/0065303 A1 | 3/2011 | Petrisor |
| 2011/0107377 A1 | 5/2011 | Petrisor et al. |
| 2011/0162015 A1 | 6/2011 | Holyoake et al. |
| 2014/0269262 A1 | 9/2014 | Petrisor et al. |

FOREIGN PATENT DOCUMENTS

| | | |
|---|---|---|
| EP | 2462513 | 6/2012 |
| GB | 2235800 | 5/1993 |
| WO | WO 90/15508 | 12/1990 |
| WO | WO 98/50848 | 11/1998 |
| WO | WO 02/061594 | 8/2002 |
| WO | WO 02/093925 | 11/2002 |
| WO | WO 03/098378 A2 | 11/2003 |
| WO | WO 2004/075486 A1 | 9/2004 |
| WO | WO 2005/004490 | 1/2005 |
| WO | WO 2006/062641 | 6/2006 |
| WO | WO 2007/035739 | 3/2007 |
| WO | WO 2008/033870 | 3/2008 |
| WO | WO 2011/017233 | 2/2011 |
| WO | WO 2011/020071 | 2/2011 |
| WO | WO 2011/022708 | 2/2011 |
| WO | WO 2011/044148 | 4/2011 |

OTHER PUBLICATIONS

Cisco Headquarters, "Guide to ATM Technology", 1999, Cisco Systems, Inc.

(56) References Cited

OTHER PUBLICATIONS

International Preliminary Report on Patentability in corresponding International Application No. PCT/US2010/046246, issued Mar. 1, 2012, 6 pages.
Marsh, George, "A380: Jumbo Step for In-Flight-Entertainment" Avionics Magazine, Mar. 1, 2006, http://www.aviationtoday.com/av/categories/commercial/792.html, 3 pages.
PCT International Patentability Report and Written Opinion re App. No. PCT/US2006/036492, dated Mar. 26, 2008.
PCT International Preliminary Report and Written Opinion re App. No. PCT/US2007/078202, dated Mar. 17, 2009.
PCT International Search Report and Written Opinion, re App. No. PCT/US2010/44017, dated Oct. 25, 2010.
PCT International Search Report and Written Opinion re App. No. PCT/US 10/46246, date of mailing Nov. 29, 2010.
PCT International Search Report and Written Opinion, re App. No. PCT/US2010/45538, dated Nov. 12, 2010.
PCT International Search Report re App. No. PCT/US2006/036492, dated Mar. 8, 2007.
PCT International Search Report re App. No. PCT/US2007/078202, dated Oct. 28, 2008.
PCT Search Report re App. No. PCT/US10/51505 dated Dec. 28, 2010.
PCT Search Report re App. No. PCT/US2004/019030, dated Jan. 14, 2005.
Texas Instruments, "IrDA Transceiver with Encoder/Decoder", http://www.ti.com/lit/ds/slus254/slus254.pdf, 1999.
International Preliminary Report on Patentability in corresponding International Application No. PCT/US2010/044017, issued Feb. 16, 2012, 9 pages.
International Preliminary Report on Patentability in corresponding International Application No. PCT/US2010/045538, issued Feb. 14, 2012, 6 pages.
International Preliminary Report on Patentability in corresponding International Application No. PCT/US2010/051505, issued Apr. 11, 2012, 5 pages.
Office Action received in corresponding Chinese Application No. 200680034350.3, mailed Mar. 31, 2012, 9 pages.

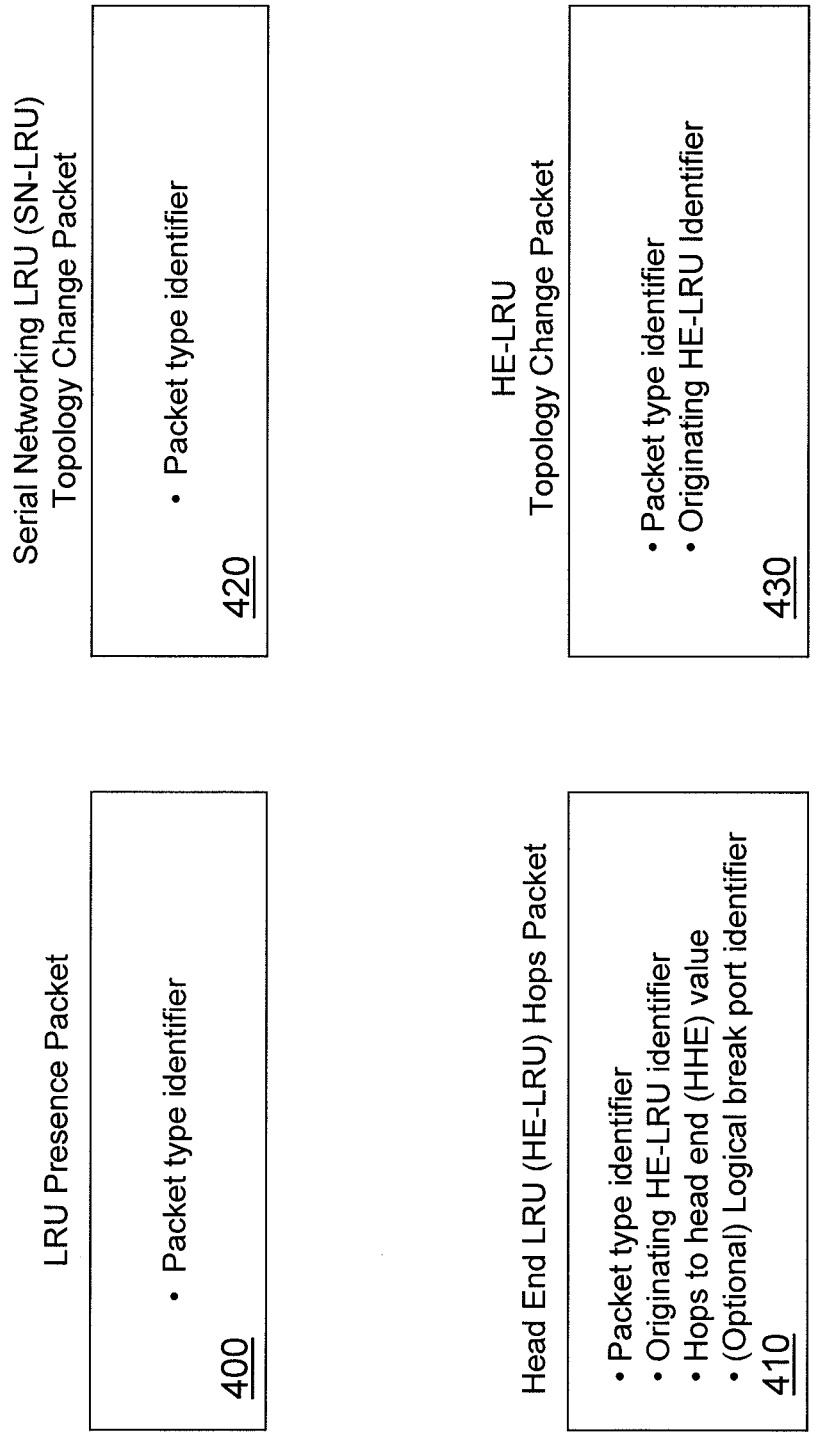

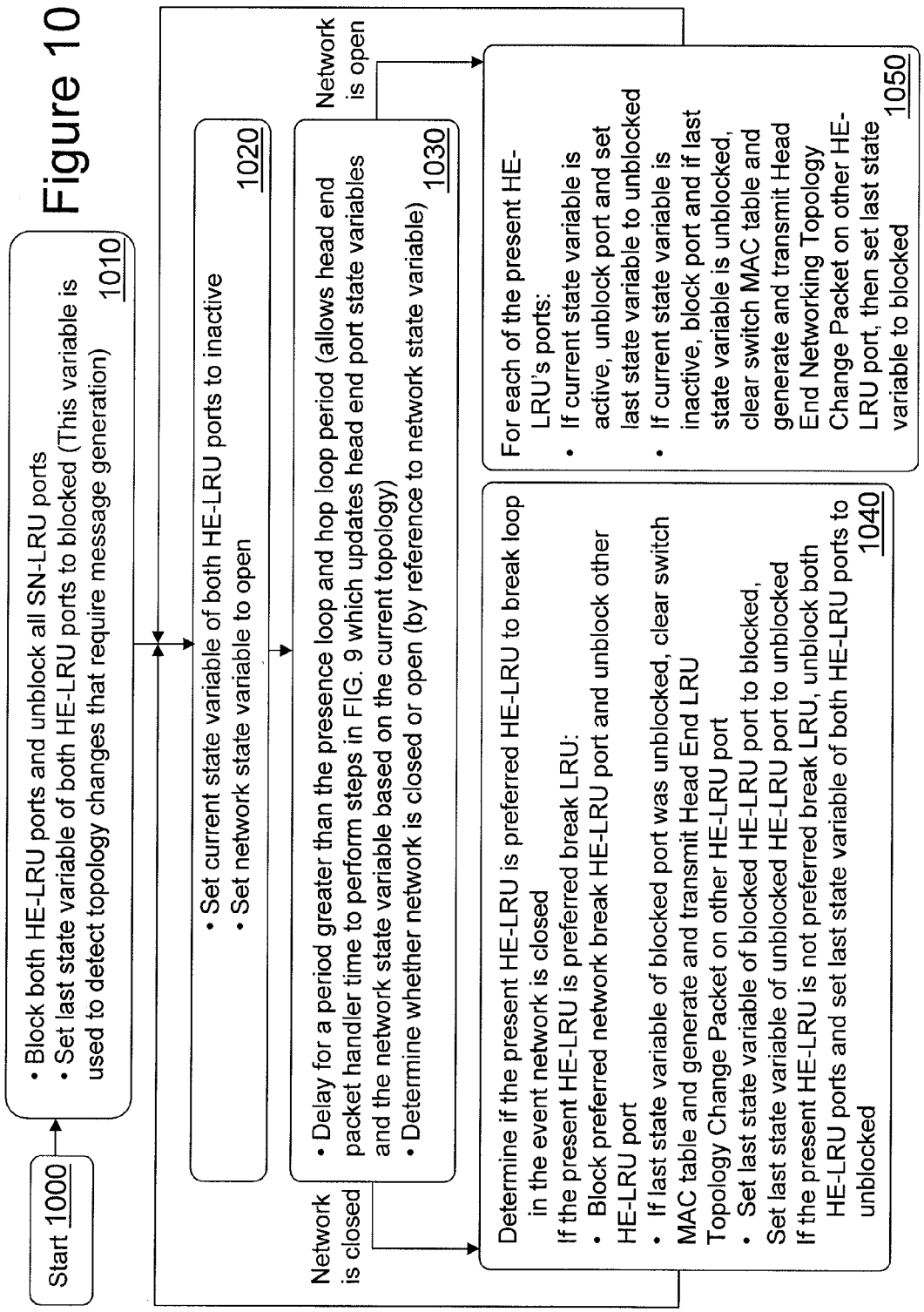

SERIAL NETWORKING FIBER OPTIC INFLIGHT ENTERTAINMENT SYSTEM NETWORK CONFIGURATION

CROSS-REFERENCE TO RELATED APPLICATIONS

This application is a continuation of U.S. application Ser. No. 12/860,437, entitled "SERIAL NETWORKING FIBER OPTIC INFLIGHT ENTERTAINMENT SYSTEM NETWORK CONFIGURATION," filed on Aug. 20, 2010, which claims priority from U.S. provisional application No. 61/274,726 entitled "SERIAL NETWORKING FIBER-TO-THE-SEAT INFLIGHT ENTERTAINMENT SYSTEM NETWORK MANAGEMENT," filed on Aug. 20, 2009, the entirety of each of which is incorporated herein by reference.

BACKGROUND OF THE INVENTION

Inflight entertainment (IFE) systems have evolved significantly over the last 25 years. Prior to 1978, IFE systems consisted of audio-only systems. In 1978, Bell and Howell (Avicom Division) introduced a group viewing video system based on VHS tapes. In 1988, Airvision introduced the first inseat video system allowing passengers to choose between several channels of broadcast video. In 1997, Swissair installed the first interactive video on demand (VOD) system. Currently, several IFE systems provide VOD with full digital video disc-like controls.

The commercial viability of an IFE system generally depends on its line replaceable units (LRUs). The term "LRU" is a term of art generally describing a complex component (e.g. "black box") on an airplane that is designed to be replaced quickly on the flight line or airport ramp area. LRUs can be beneficial because they are generally self-contained units that can be rapidly swapped-out in the event that maintenance is required thus allowing the airplane to continue to operate with little down time. Before being installed on an airplane, an LRU design should be approved by the Federal Aviation Administration by means defined in Title 14 of the Code of Federal Regulations. An IFE system's installation costs, operating costs, maintenance costs and passenger comfort depend greatly on the size, form factor, number and weight of its LRUs, as well as the number of distinct LRUs deployed in a single aircraft and across an airline's entire fleet of aircraft.

SUMMARY OF THE INVENTION

The dedicated fiber optic IFE system architecture described in U.S. Patent Application Publication No. 2007/0077998, for example the system marketed under the tradename FIBER-TO-THE-SCREEN™ (FTTS™) by Lumexis, Inc., has provided the airline industry with a modular, scalable, extensible, and future proofed IFE system that leverages terrestrial VOD hardware and software advances and is packaged to minimize the number of distinct LRU not only in a single aircraft but across an airline's entire fleet of aircraft (e.g. regional jets to jumbo jets). In some dedicated fiber optic IFE systems, such as the system shown in FIG. 1, head end servers are interconnected in a ring using bidirectional fiber optic links and communicate with passenger seat video display units (VDUs) over respective bidirectional links. This architecture offers advantages over traditional IFE systems in eliminating distribution area LRUs (i.e. there are no active components between the head end and the seat end). However, this architecture has certain drawbacks. First, a head end server is single point of failure for all passenger seat VDUs and cabin management terminals that connect directly to that head end server. Second, the implementation of a star wired network topology wherein each passenger seat VDU has a dedicated optical fiber "home run" to a head end server adds cost and complexity to the system. For example, over two miles of fiber are required on a typical narrow body aircraft installation and over four miles of fiber are required on a typical wide body aircraft installation. The high cost of aircraft grade fiber and fiber optic connectors, coupled with the cost and complexity of installing these fiber components, make this architecture very expensive to implement.

This architecture can be enhanced as generalized in FIG. 2, wherein reliability can be improved and costs reduced by providing a serial networking dedicated fiber optic IFE system wherein "chains" of passenger seat VDUs are connected on both ends to a "ring" of head end servers. In this enhanced architecture, rather than communicating with the head end over a dedicated data path, each passenger seat VDU communicates with the head end over a shared loop-free data path of a serial network established on selected redundant physical connections. This architecture reduces fiber component requirements relative to the architecture generalized in FIG. 1 and has the potential to exhibit superior failure recovery characteristics. However, known network configuration protocols that create loop-free network topologies, such as Rapid Spanning Tree Protocol (IEEE Std. 802.1w), are not well-suited for use in serial networking dedicated fiber optic IFE systems.

Accordingly, in some embodiments, the present invention provides serial networking dedicated fiber optic IFE systems, methods therefor and components thereof, that exhibit improved configuration and failover attributes through implementation of novel network configuration protocols. In various aspects of the invention, head end LRUs (HE-LRUs) may be head end servers of an IFE system and serial networking LRUs (SN-LRUs) may be passenger seat VDUs of an IFE system, by way of example.

In some aspects of the invention, an IFE system comprises a plurality of HE-LRUs and a plurality of SN-LRUs, wherein each of the SN-LRUs individually detects that a closed system network has been formed between the plurality of HE-LRUs and the plurality of SN-LRUs based on a plurality of packets sourced by at least one of the HE-LRUs and received on a plurality of ports of each of the SN-LRUs, and wherein in response to detecting that the closed system network has been formed at least one of the SN-LRUs blocks at least one of its ports based on further detecting that the SN-LRU is a middle SN-LRU. The SN-LRU may determine that it is a middle SN-LRU based on a comparison of hops to head end values contained in the plurality of packets. The SN-LRU may determine that it is a middle SN-LRU based on the comparison indicating a difference between the hops to head end values of no greater than one. The SN-LRU may clear a topology database on the SN-LRU in response to detecting that the closed system network has been formed and based on further detecting that the SN-LRU is a middle SN-LRU. The SN-LRU may transmit a topology change packet on an unblocked at least one of its ports in response to detecting that the closed system network has been formed and based on further detecting that the SN-LRU is a middle SN-LRU. Moreover, each of the HE-LRUs may individually detect that a closed head end network has been formed between the plurality of HE-LRUs based on a packet transmitted by the HE-LRU on a first port and received by the HE-LRU on a second port, wherein in response to detecting that the closed head end network has been formed at least one of the HE-LRUs block at least one of the first or second port based on further detecting that the HE-LRU is a designated break LRU. The HE-LRU may clear a topology database on the HE-LRU in response to detecting that the closed head end network has been formed and based on further detecting that the HE-LRU is a designated break LRU. The HE-LRU may transmit a topology change packet on an unblocked at least one of its ports in response to detecting that the closed head end network has been formed and based on further detecting that the HE-LRU is a designated break LRU.

In other aspects of the invention, a SN-LRU for an IFE system having a plurality of HE-LRUs and a plurality of SN-LRU comprises a processor and a plurality of ports communicatively coupled with the processor, wherein under control of the processor the SN-LRU selectively blocks at least one of the ports based on a comparison of a first hops to head end value contained in a first packet sourced by a HE-LRU and received on a first one of the ports and a second hops to head end value contained in a second packet sourced by a HE-LRU and received on a second one of the ports. The SN-LRU may under control of the processor block at least one of the ports if the comparison indicates that a difference between the hops to head end values is no greater than one. The SN-LRU may under control of the processor block at least one port over which the packet containing the higher hops to head end value was received. The SN-LRU may under control of the processor selectively clear a topology database on the SN-LRU based on the comparison. The SN-LRU may under control of the processor selectively transmit a topology change packet on an unblocked at least one of the ports based on the comparison.

In yet other aspects of the invention, a HE-LRU for an IFE system having a plurality of HE-LRUs and a plurality of SN-LRU comprises a processor and a plurality of ports communicatively coupled with the processor, wherein under control of the processor the HE-LRU blocks at least one of the ports based on detecting that a packet transmitted on a first one of the ports has been received on a second one of the ports and based on further detecting that the HE-LRU is a designated break LRU. The HE-LRU may under control of the processor clear a topology database on the HE-LRU based on detecting that a packet transmitted on a first one of the ports has been received on a second one of the ports and based on further detecting that the HE-LRU is a designated break LRU. The HE-LRU may under control of the processor transmit a topology change packet on at least one unblocked port based on detecting that a packet transmitted on a first one of the ports has been received on a second one of the ports and based on further detecting that the HE-LRU is a designated break LRU.

In yet other aspects of the invention, a network configuration method performed by a SN-LRU of an IFE system having a plurality of HE-LRUs and a plurality of SN-LRUs comprises the steps of receiving on a first port of the SN-LRU a first packet sourced by a HE-LRU and having a first hops to head end value, receiving on a second port of the SN-LRU a second packet sourced by a HE-LRU and having a second hops to head end value, comparing the first and second hops to head end values, and selectively blocking at least one of the ports based on the comparison. The method may further comprise blocking at least one of the ports if the comparison indicates that a difference between the first and second hops to head end values is no greater than one. The method may further comprise blocking at least one of the ports over which the packet containing the higher hops to head end value was received. The method may further comprise selectively clearing a topology database on the SN-LRU based on the comparison. The method may further comprise selectively transmitting a topology change packet on an unblocked port based on the comparison.

In yet other aspects of the invention, an IFE system comprises a plurality of HE-LRUs and a plurality of SN-LRUs, wherein each of the SN-LRUs individually detects that a closed system network has been formed between the plurality of HE-LRUs and the plurality of SN-LRUs based on a plurality of packets sourced by at least one of the HE-LRUs and received on a plurality of ports of each of the SN-LRUs, and wherein in response to detecting that the closed system network has been formed at least one of the SN-LRUs provides a logical break point for the network based on historical break information.

In still other aspects of the invention, a network configuration method performed by a SN-LRU of an IFE system having a plurality of HE-LRUs and a plurality of SN-LRUs comprises the steps of receiving on a first port of the SN-LRU a first packet sourced by a first HE-LRU, receiving on a second port of the SN-LRU a second packet sourced by a second HE-LRU, determining by the SN-LRU that a closed system network has been formed between the plurality of HE-LRUs based on the first and second packet, determining by the SN-LRU that the SN-LRU provides a logical break point for the network based on historical break information and providing by the SN-LRU a logical break point for the network.

These and other aspects of the invention will be better understood when taken in conjunction with the detailed description of the preferred embodiment and the drawings that are briefly described below. Of course, the invention is defined by the appended claims.

BRIEF DESCRIPTION OF THE DRAWINGS

FIG. 4 shows network configuration packets transmitted in a serial networking dedicated fiber optic system in some embodiments of the invention.

FIG. 10 shows a method performed by HE-LRU decision logic in some embodiments of the invention.

DETAILED DESCRIPTION OF A PREFERRED EMBODIMENT

Figure 1:
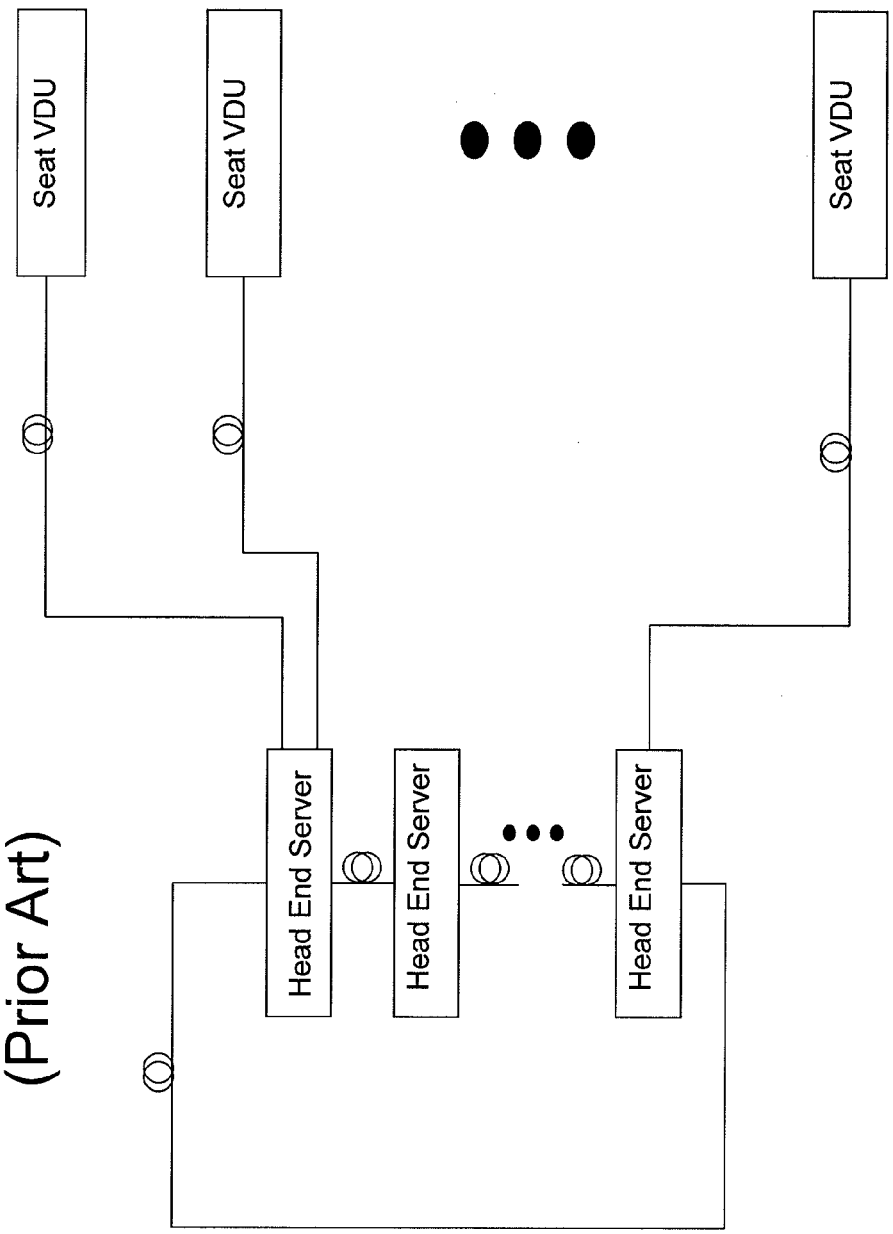
FIG. 1 shows a known dedicated fiber dedicated fiber optic system architecture
Figure 2:
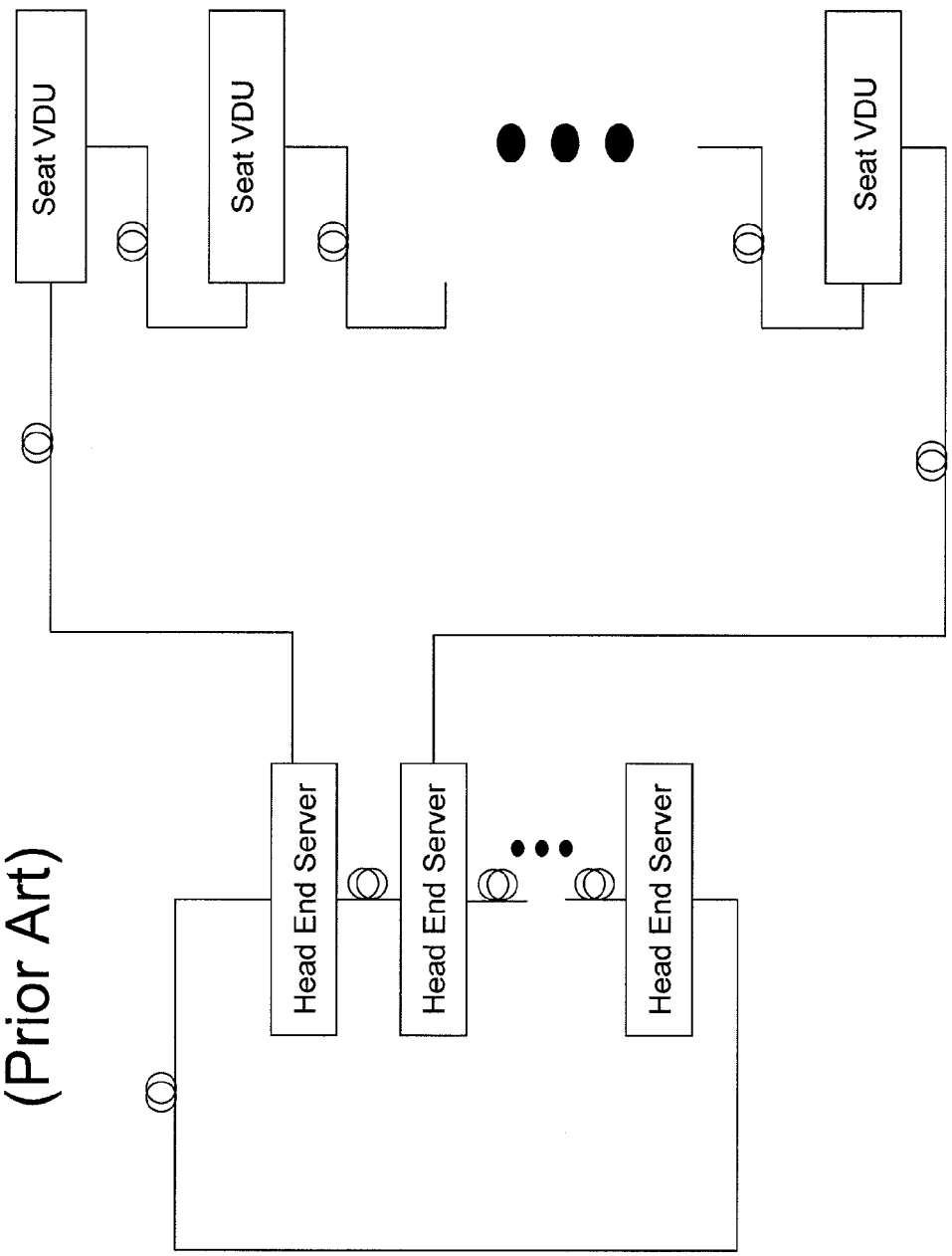
FIG. 2 shows a known serial networking dedicated fiber optic system architecture.
Figure 3:
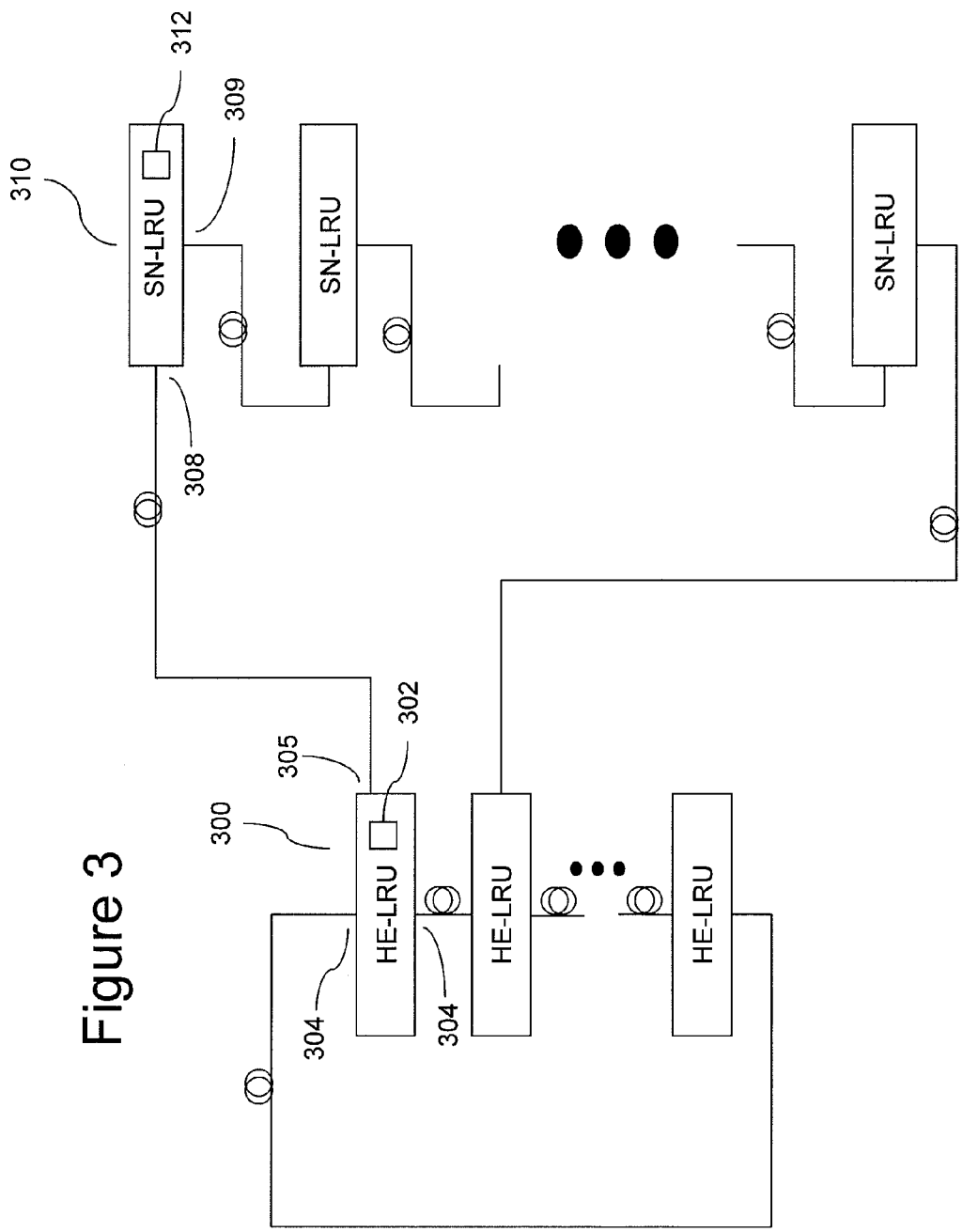
FIG. 3 shows a serial networking dedicated fiber optic system architecture in which the present invention may be operative.

FIG. 3 shows a serial networking dedicated fiber optic system architecture in which the present invention may be operative. The architecture includes HE-LRUs 300, which may be head end servers, and SN-LRUs 310, which may be seat VDUs. Each HE-LRU has at least two HE-LRU ports 304 that each connect to an adjacent HE-LRU and zero or more SN-LRU ports 305 that each connect to an adjacent SN-LRU. Each of the HE-LRU ports 304, 305 can be communicatively coupled with a processor on the HE-LRU (e.g. processor 302). Each SN-LRU has at least two ports 308, 309 that can each connect to an adjacent HE-LRU or SN-LRU. The ports 308, 309 can be communicatively coupled with a processor on the SN-LRU (e.g. processor 312). Moreover, each HE-LRU and SN-LRU can have a topology database, such as a forwarding table that associates media access control (MAC) addresses of other LRUs with output ports of the HE-LRU or SN-LRU. The topology database in each HE-LRU and SN-LRU can be communicatively coupled with the processor on the HE-LRU or SN-LRU.

In the architecture illustrated, a HE-LRUs 300 is connected to SN-LRUs at the edge of a serial chain of SN-LRUs 310 over a bidirectional link, e.g. fiber optics. Generally, the edge SN-LRUs connect back to different HE-LRUs 300. At the head end, HE-LRUs 300 are connected to adjacent HE-LRUs over bidirectional links to form a ring of HE-LRUs. At the seat end, SN-LRUs 310 are connected to adjacent SN-LRUs over bidirectional links to form a serial chain of SN-LRUs. The system can employ most any type of bidirectional link, such as fiber optics, copper wire, coaxial cable, wireless communication, or the like. In several embodiments, fiber optic links are employed to, among other advantages, increase data transfer rate and/or capacity.

Network configuration protocols described herein are generally run to create and maintain a loop-free network topology on top of the architecture through selective transmission and processing of configuration packets and selective blocking and unblocking of HE-LRU and SN-LRU ports.

FIG. 4 shows some of the types of network configuration packets transmitted in a serial networking dedicated fiber optic system in some embodiments of the invention. Network configuration packets may pass through both blocked and unblocked HE-LRU and SN-LRU ports, whereas data packets (e.g. entertainment packets) may pass through unblocked ports but may not pass through blocked ports.

A LRU presence packet 400 contains a packet type identifier indicating that packet 400 is a LRU presence packet. Packet 400 is used by a LRU to determine whether a port is connected to a live LRU.

A HE-LRU hops packet 410 contains at least three fields. A first field is a packet type identifier indicating that packet 410 is a HE-LRU hops packet. A second field is an identifier uniquely associated with the HE-LRU that originated packet 410. This field is used by a HE-LRU to determine whether a received packet was originated by the HE-LRU itself (i.e. whether the packet has looped-back). A third field is a hops to head end (HHE) value that is used to track the number of LRU hops packet 410 has completed over a serial network chain.

A SN-LRU topology change packet 420 contains a packet type identifier indicating that packet 420 is a SN-LRU topology change packet. Packet 420 is transmitted over a serial network chain and each SN-LRU that receives packet 420 clears its topology database and forwards packet 420 along the chain. HE-LRUs convert received SN-LRU topology change packets into HE-LRU topology change packets that are circulated at the head end of the system.

A HE-LRU topology change packet 430 contains at least two fields. A first field is a packet type identifier indicating that packet 430 is a HE-LRU topology change packet. A second field is an identifier uniquely associated with the HE-LRU that originated packet 430. Packet 430 is circulated at the head end of the system in response to a detected topology change. In some embodiments, each HE-LRU that receives packet 430 clears its topology database.

Figure 5:
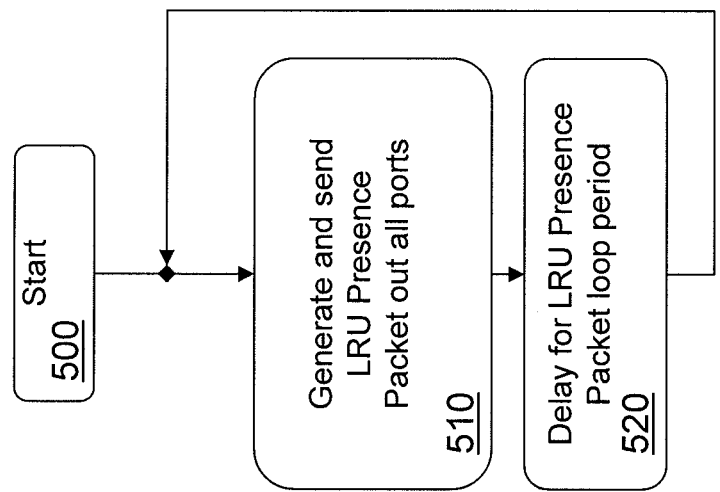
FIG. 5 shows a LRU presence packet generation flow in some embodiments of the invention.

FIG. 5 shows a LRU presence packet generation flow in some embodiments of the invention. After startup (500), an originating LRU (e.g. HE-LRU and/or SN-LRU) under local processor control generates and sends a LRU presence packet out all the originating LRU's ports (510). The originating LRU delays for a period of time equal to the inverse of a configured refresh rate for the presence packet (520) after which it repeats the process in loop. In some embodiments, each HE-LRU and SN-LRU include a processor and execute this presence packet generation flow method under local processor control.

Figure 6:
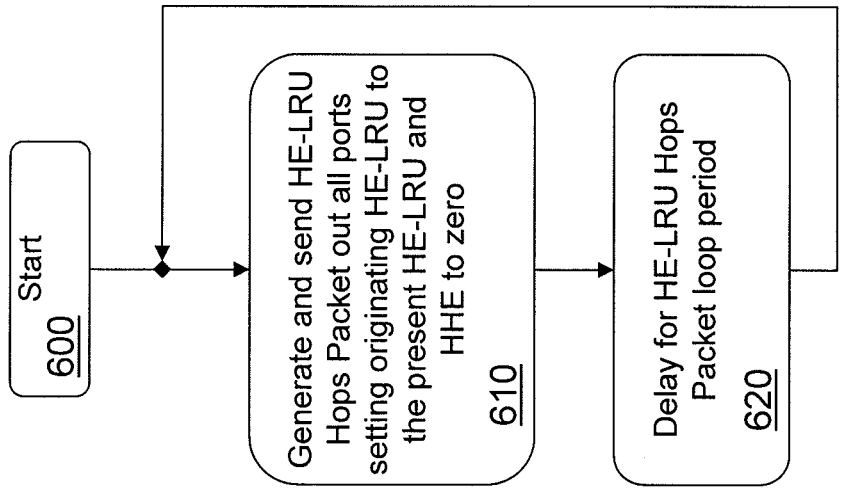
FIG. 6 shows a HE-LRU hops packet generation flow in some embodiments of the invention.

FIG. 6 shows a HE-LRU hops packet generation flow in some embodiments of the invention. After startup (600), an originating HE-LRU under local processor control generates and sends a HE-LRU hops packet out all the originating HE-LRU's ports (610). The originating HE-LRU delays for a period of time equal to the inverse of a configured refresh rate for the HE-LRU hops packet (620) after which it repeats the process in loop. In some embodiments, each HE-LRU executes this hops packet generation flow method under local processor control.

Figure 7:
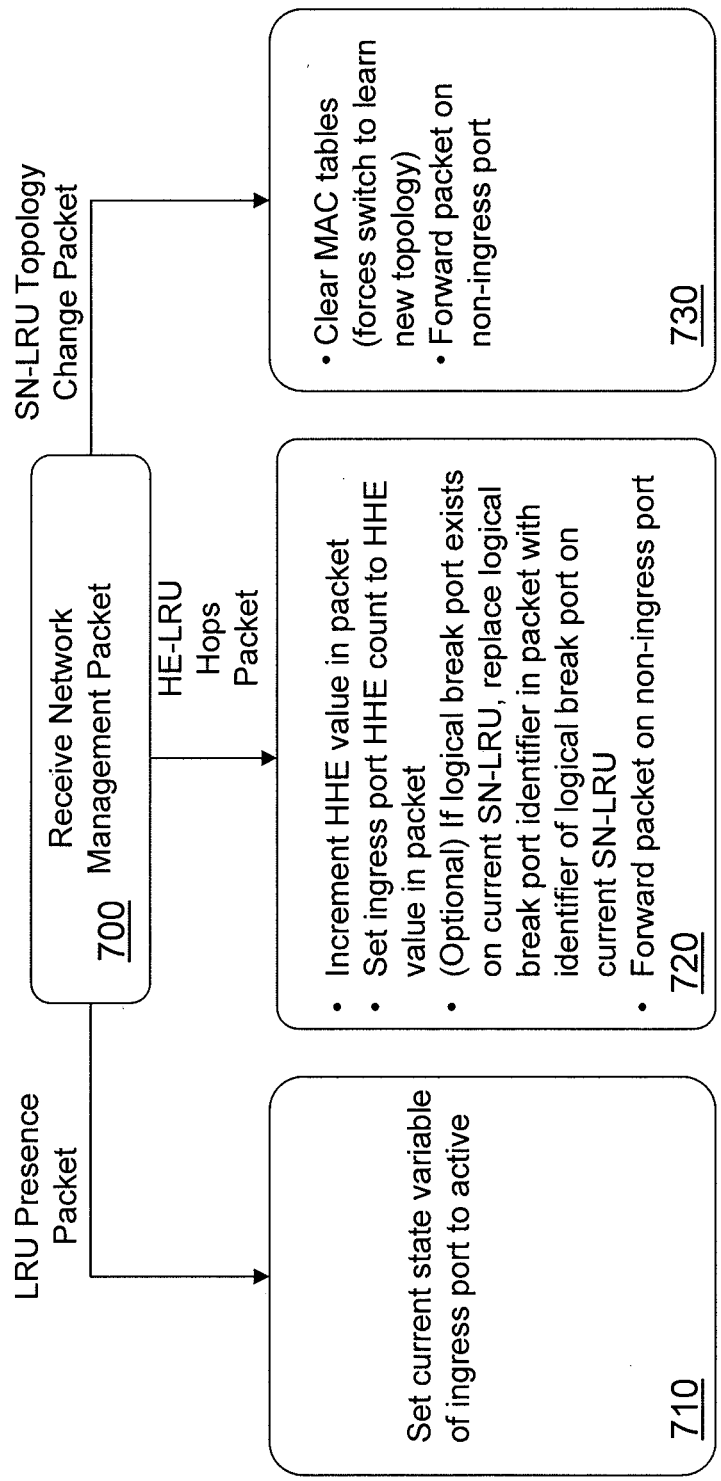
FIG. 7 shows a method performed by a SN-LRU packet handler in some embodiments of the invention.

FIG. 7 shows a method performed by a SN-LRU packet handler in some embodiments of the invention. Upon reception of a management packet, a packet handler executed by a processor on the SN-LRU determines the packet type by inspecting the packet type identifier field in the packet (700). In some arrangements, the packet handler processes three packet types: LRU presence packet, HE-LRU hops packet, and SN-LRU topology change packet. If the packet is a LRU presence packet, the packet handler sets a current state variable of the ingress port (i.e. the port on which the packet was received) to active (710). The current state variable informs decision logic executed by the processor that the ingress port is connected to a live LRU. If the packet is a HE-LRU hops packet, the packet handler increments the HHE value in the packet, sets the ingress port HHE count to the HHE value in the packet, and forwards the updated HE-LRU hops packet to the non-ingress port (720). If the packet is a SN-LRU topology change packet, the packet handler clears the topology database on the SN-LRU and forwards the packet out the non-ingress port (730).

Figure 8:
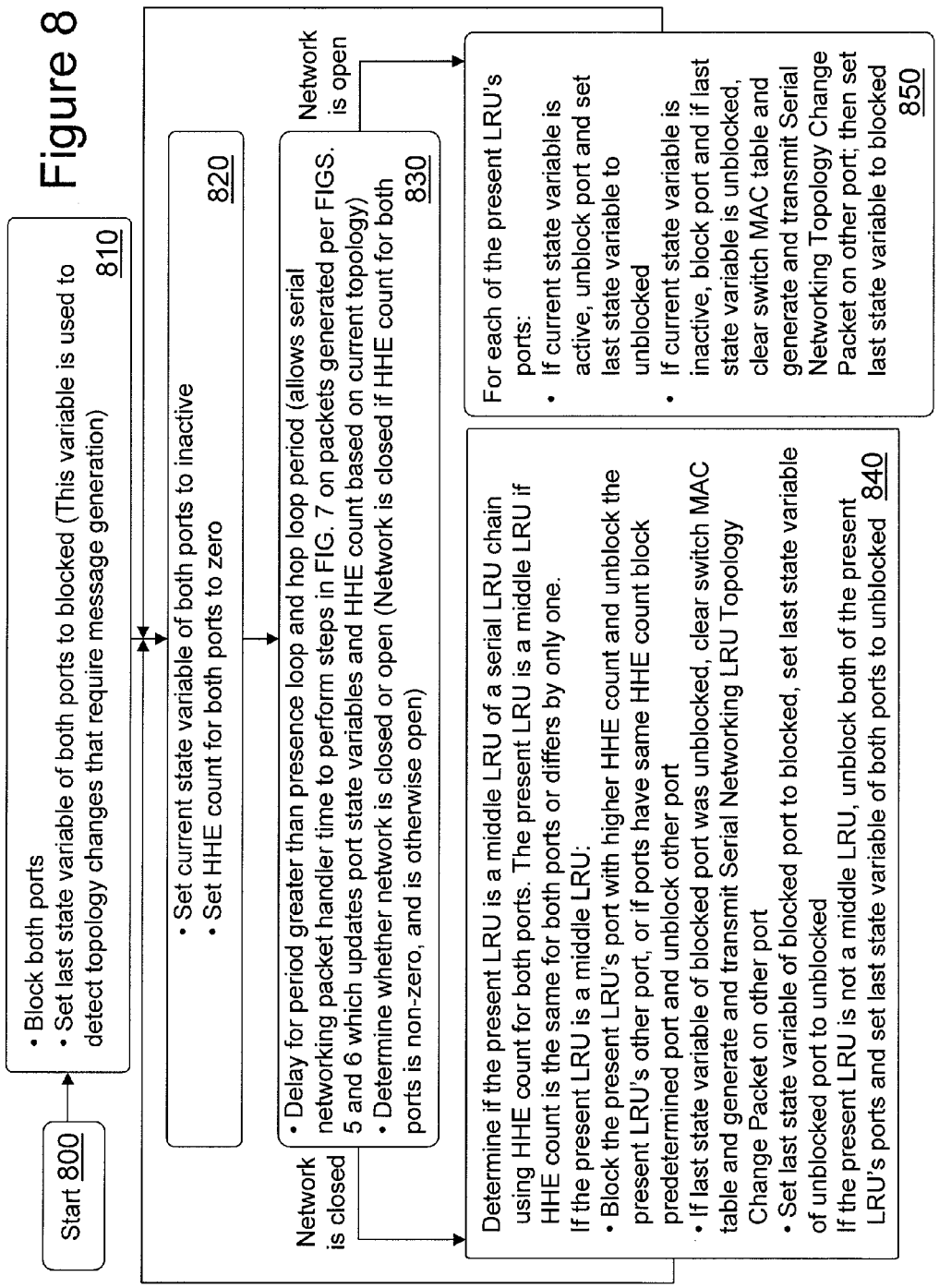
FIG. 8 shows a method performed by SN-LRU decision logic in some embodiments of the invention.

FIG. 8 shows a method performed by SN-LRU decision logic in some embodiments of the invention. After startup (800), logic executed by a processor on the SN-LRU blocks both ports of the SN-LRU and sets a last state variable of both ports to blocked (810). The flow then proceeds to the main processing loop. At the start of each pass through the main processing loop, the logic sets a current state variable of both ports to inactive and sets the HHE count for both ports to zero (820). The logic then delays for a period greater than the presence loop and hop loop periods to afford the packet handler ample time to perform the steps shown in FIG. 7 on packets generated in accordance with FIGS. 5 and 6, which updates port state variables and HHE count based on the current network topology. After the delay, the logic determines whether the serial network chain of which the SN-LRU is a part is closed or open by inspecting the HHE count for both ports. If either count is zero, then the network is open (i.e. paths do not exist in both directions to a HE-LRU). If both counts are non-zero, the network is closed (i.e. paths exist in both directions to a HE-LRU) (830).

If the network is closed, the flow proceeds to Step 840 where the logic first determines whether the SN-LRU on which the logic is operative is a middle LRU of a serial network chain. This is determined by comparing the HHE count for both ports. If the HHE count for both ports is the same or differs by only one hop, the SN-LRU is a middle LRU; otherwise, the SN-LRU is not a middle LRU. If the SN-LRU is a middle LRU, the SN-LRU has responsibility to break the chain and create a loop-free network topology. In that event, the logic blocks the port with the higher HHE count (i.e. longer path to the head end) and unblocks the other port. If the HHE count for both ports is identical, the logic blocks a predetermined at least one of the ports and unblocks the other port. The logic next determines whether the last state variable of the blocked port is unblocked. If the last state variable of the blocked port is unblocked, the network topology changed in a way that put the SN-LRU at the end of a chain and thus the SN-LRU should inform the system of the topology change. Accordingly, the logic clears the topology database and generates and transmits on the unblocked port a SN-LRU topology change packet, forcing relearning of the network topology. The logic next sets the last state variable of the blocked port to blocked, and sets the last state variable of the unblocked port to unblocked. If the SN-LRU determines it is not a middle LRU, the logic unblocks both ports and sets the last state variable of both ports to unblocked.

If the network is open, the flow proceeds to Step 850 where the logic determines for each port whether the current state variable is active or inactive and takes appropriate action. If the current state variable is active, the logic unblocks the port and sets the last state variable to unblocked. If the current state variable is inactive, the logic blocks the port and, if the last state variable is unblocked, clears the topology database and transmits a SN-LRU topology change packet on the unblocked port, forcing relearning of the network topology. Finally, the logic sets the last state variable to blocked.

Figure 9:
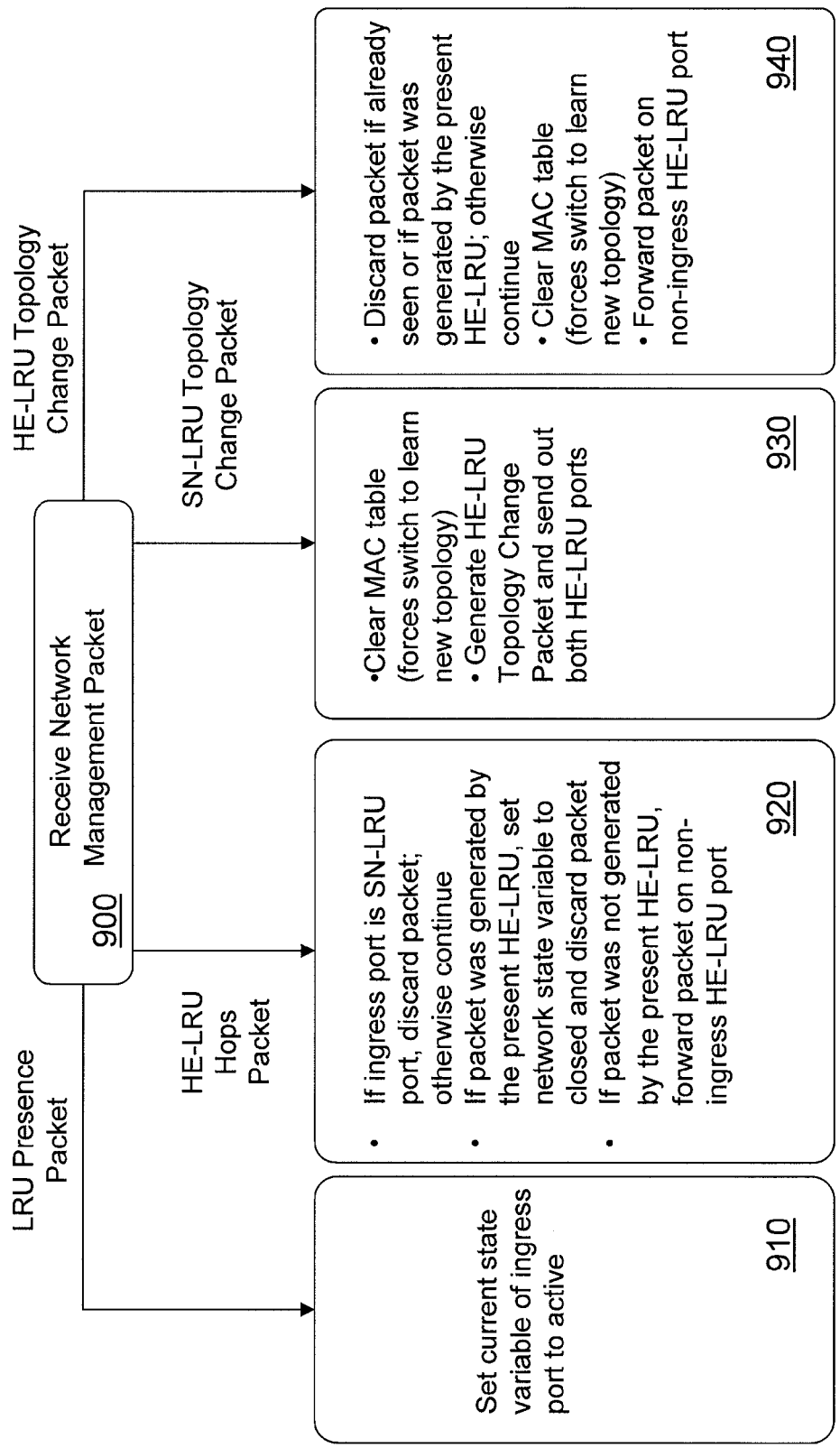
FIG. 9 shows a method performed by a HE-LRU packet handler in some embodiments of the invention.

FIG. 9 shows a method performed by a HE-LRU packet handler in some embodiments of the invention. Upon reception of a management packet, a packet handler executed by a processor on the HE-LRU determines the packet type by inspecting the packet type identifier field in the packet (900). In the embodiment shown, the HE-LRU packet handler processes four packet types: LRU presence packet, HE-LRU hops packet, SN-LRU topology change packet, and HE-LRU topology change packet. If the packet is a LRU presence packet, the packet handler sets the current state variable of the ingress port to active (910). The current state variable generally informs decision logic executed by the processor that the ingress port is connected to a live LRU. If the packet is a HE-LRU hops packet, the packet handler first determines whether the ingress port is a SN-LRU port and, if so, discards the packet. The packet handler then determines if the packet was originated by the HE-LRU itself (i.e. whether the packet has looped-back). If the HE-LRU is the originating HE-LRU for this packet, the network is closed and the packet handler sets a network state variable to closed and discards the packet. If, on the other hand, the HE-LRU is not the originating HE-LRU for this packet, the packet handler forwards the packet on the non-ingress HE-LRU port (920). Upon reception of a SN-LRU topology change packet, the packet handler clears the topology database and transmits a HE-LRU topology change packet on both HE-LRU ports to inform other HE-LRUs of the topology change (930). Upon reception of a HE-LRU topology change packet, the packet handler first determines if the packet was originated by the HE-LRU itself (i.e. whether the packet has looped-back). If the HE-LRU is the originating HE-LRU for this packet, the packet handler discards the packet; otherwise, the packet handler clears the topology database and forwards the packet to the non-ingress HE-LRU port (940).

FIG. 10 shows a method performed by HE-LRU decision logic in some embodiments of the invention. After startup (1000), logic executed by a processor on the HE-LRU generally blocks both HE-LRU ports, unblocks all SN-LRU ports, and sets a last state variable of both HE-LRU ports to blocked (1010). The flow then proceeds to the main processing loop. At the start of each pass through the main processing loop, the logic sets a current state variable of both HE-LRU ports to inactive and sets the network state variable to open (1020). The logic then delays for a period greater than the presence loop and hop loop periods to afford the packet handler ample time to perform the steps shown in FIG. 9 which updates port state variables and the network state variable based on the current network topology. After the delay, the logic determines whether the head end ring network of which the HE-LRU is a part is closed or open by reference to the network state variable (1030).

If the network is closed, the logic at Step 1040 first determines whether the HE-LRU on which the logic is operative has been designated to break the loop. This is determined by referencing a unique break LRU identifier available to the HE-LRU. If the HE-LRU is the designated break LRU, the HE-LRU has responsibility to break the ring and create a loop-free head end network topology. In that event, the logic blocks a predetermined at least one of the HE-LRU ports and unblocks the other HE-LRU port. The logic next determines whether the last state variable of the blocked port is unblocked. If the last state variable of the blocked port is unblocked, the HE-LRU should inform the system of the topology change. Accordingly, the logic clears the topology database and generates and transmits a HE-LRU topology change packet on the unblocked HE-LRU port, forcing relearning of the network topology. The logic next sets the last state variable of the blocked HE-LRU port to blocked, and sets the last state variable of the unblocked HE-LRU port to unblocked. If the HE-LRU determines it is not the designated break LRU, the logic unblocks both HE-LRU ports and sets the last state variable of both HE-LRU ports to unblocked.

If the network is open, the logic at Step 1050 determines for each HE-LRU port whether the current state variable is active or inactive and takes appropriate action. If the current state variable is active, the logic unblocks the port and sets the last state variable to unblocked. If the current state variable is inactive, the logic blocks the port and, if the last state variable is unblocked, clears the topology database and transmits a HE-LRU networking topology change packet on the unblocked port, forcing relearning of the network topology. Finally, the logic sets the last state variable to blocked.

Figure 11A:
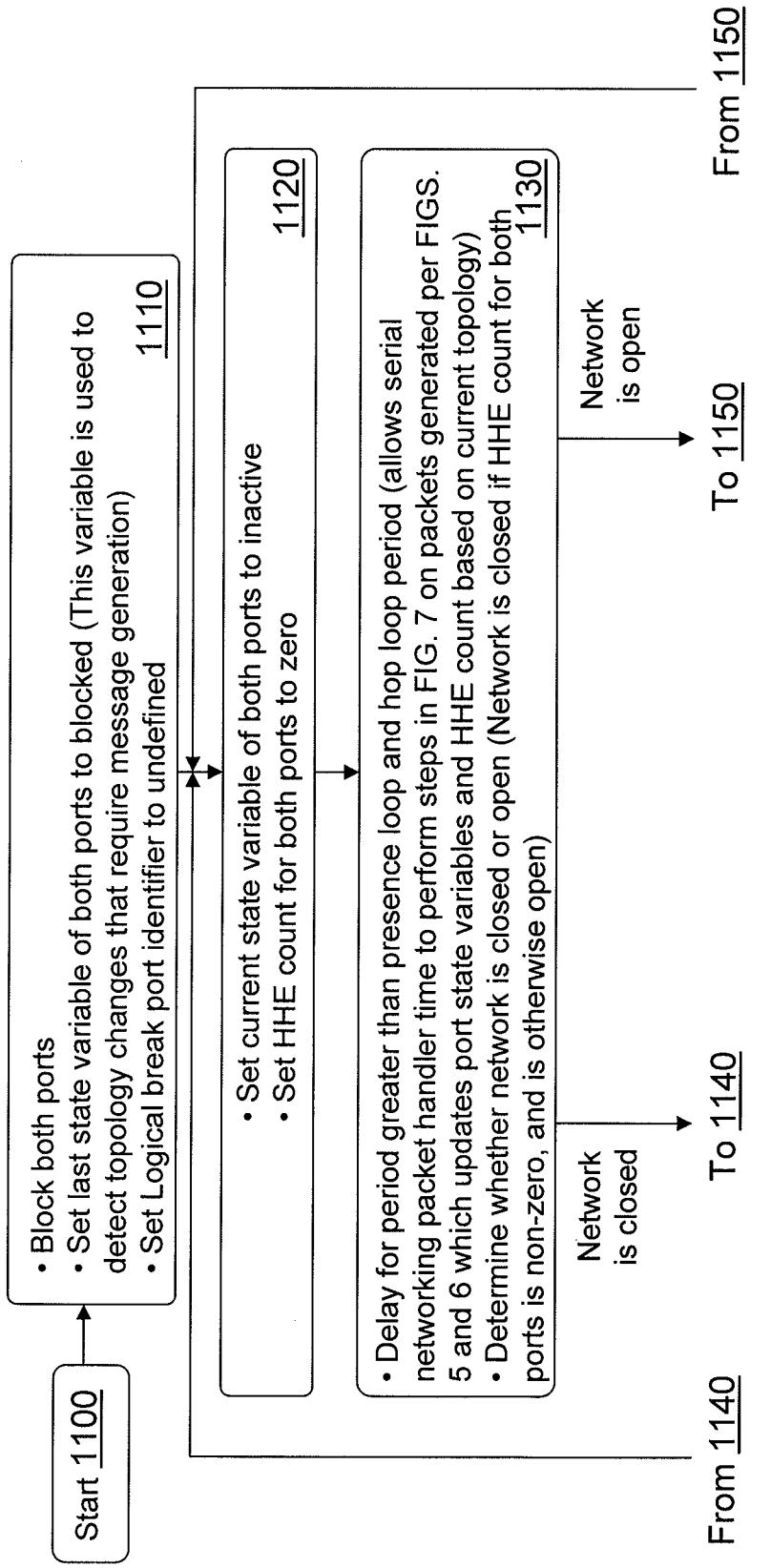
FIGS. 11A and 11B show a method performed by SN-LRU decision logic in some embodiments of the invention.
Figure 11B:
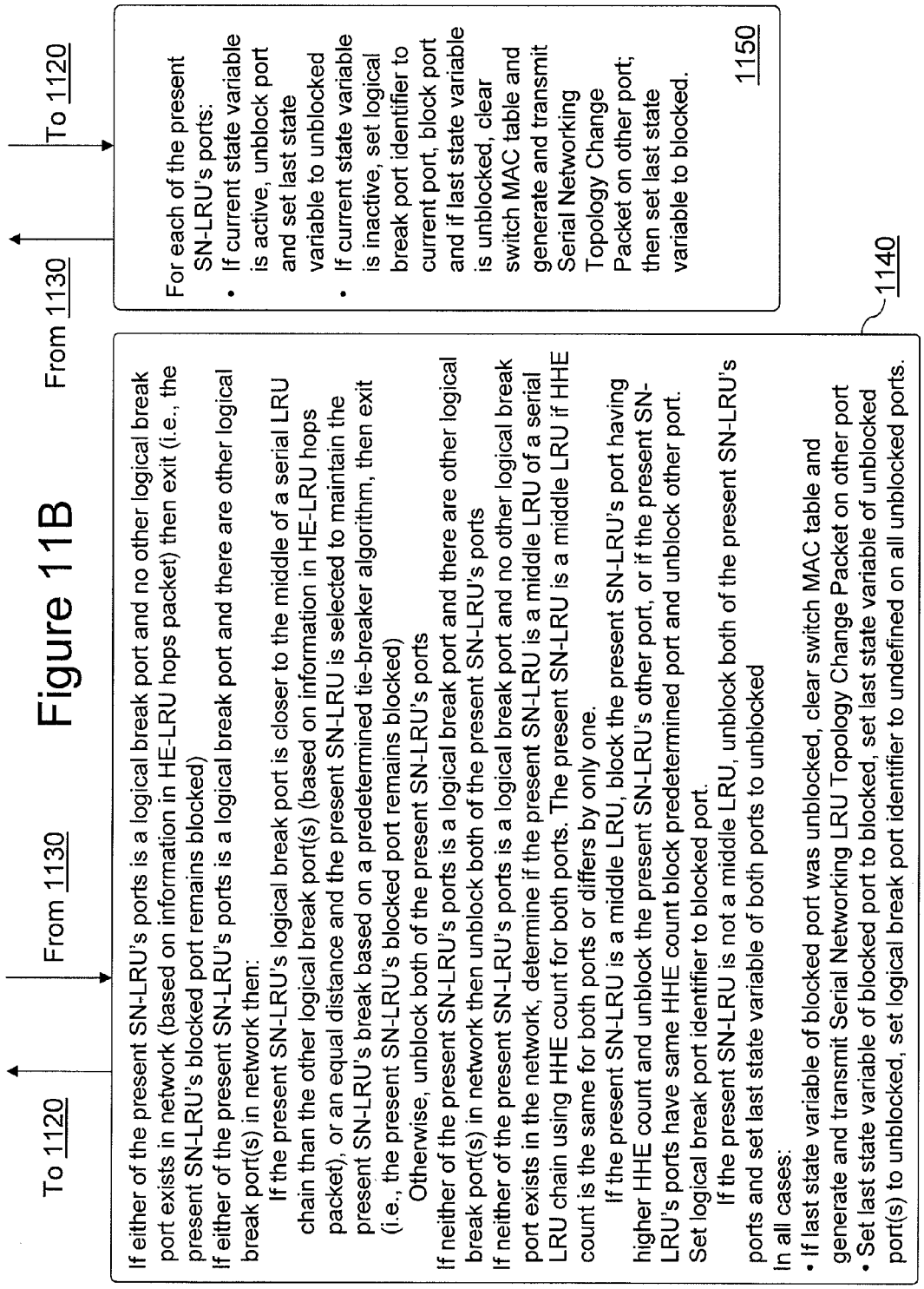

FIGS. 11A and 11B show a method performed by SN-LRU decision logic in some embodiments of the invention. In these embodiments, after an SN-LRU chain recovers from a fault, the break point in an SN-LRU chain is maintained at the initial break point rather than reverting to the middle of the SN-LRU chain. The initial break point is kept in these embodiments to avoid "ping ponging" between the initial break point and a break point at the middle of the SN-LRU chain when failure at the initial break point is a recurring problem. As shown in FIG. 4, in these embodiments historical break information is shared between SN-LRUs using a logical break port identifier that is carried in HE-LRU hops packets 410, as will be explained now in greater detail.

Referring to Step 720 of FIG. 7, an SN-LRU that has detected a physical break at one of its ports applies to an HE-LRU hops packet that it receives on its ingress port a logical break port identifier identifying its physical break port before forwarding the HE-LRU hops packet on its non-ingress port, replacing any logical break port identifier contained in the packet as received. SN-LRUs in an SN-LRU chain reference the logical break port identifiers (or absence thereof) in received HE-LRU packets to identify an appropriate physical break point for the chain, as will now be explained in conjunction with FIGS. 11A and 11B.

After startup (1100), logic executed by a processor on the SN-LRU blocks both ports of the SN-LRU, sets a last state variable of both ports to blocked, and sets its logical break port identifier to undefined (1110). The flow then proceeds to the main processing loop. At the start of each pass through the main processing loop, the logic sets a current state variable of both ports to inactive and sets the HHE count for both ports to zero (1120). The logic then delays for a period greater than the presence loop and hop loop periods to afford the packet handler ample time to perform the steps shown in FIG. 7 on packets generated in accordance with FIGS. 5 and 6, which updates port state variables and HHE count based on the current network topology. After the delay, the logic determines whether the serial network chain of which the SN-LRU is a part is closed or open by inspecting the HHE count for both ports. If either count is zero, then the network is open (i.e. paths do not exist in both directions to a HE-LRU). If both counts are non-zero, the network is closed (i.e. paths exist in both directions to a HE-LRU) (1130).

If the network is closed, the flow proceeds to Step 1140 where the logic first determines whether a logical break port exists in the network as a result of a previous failure from which recovery has been made. If either of the ports on the SN-LRU on which the logic is operative is a logical break port (due to a previous physical break at that port) and no other logical break port exists in the network, the flow returns to Step 1120 without further action, resulting in a blocked port on the SN-LRU remaining blocked.

If either of the ports on the SN-LRU on which the logic is operative is a logical break port and another logical break port exists in the network, a further check is made to determine which of the logical break ports is closer to the middle of the SN-LRU chain, which can be determined by reference to HHE counts. In that event, if the logical break port on the SN-LRU on which the logic is operative is closer to the middle, or is the same distance from the middle and indicated to win in the event of a tie, the flow returns to Step 1120 without further action, resulting in a blocked port on the SN-LRU remaining blocked. On the other hand, if the logical break port on the SN-LRU on which the logic is operative is further from the middle, or is the same distance from the middle and indicated to lose in the event of a tie, the logic unblocks both of the ports on the SN-LRU.

In some embodiments, if neither of the ports on the SN-LRU on which the logic is operative is a logical break port and another logical break port exists in the network, the logic unblocks both of the ports on the SN-LRU.

In certain arrangements, if neither of the ports on the SN-LRU on which the logic is operative is a logical break port and no other logical break port exists in the network, the SN-LRU on which the logic is operative determines if it is a middle LRU of a serial network chain. This is determined by comparing the HHE count for both ports. If the HHE count for both ports is the same or differs by only one hop, the SN-LRU is a middle LRU; otherwise, the SN-LRU is not a middle LRU. If the SN-LRU is a middle LRU, the logic blocks the port with the higher HHE count (i.e. longer path to the head end) and unblocks the other port. If the HHE count for both ports is identical, the logic blocks a predetermined at least one of the ports and unblocks at least one other port. If the SN-LRU determines it is not a middle LRU, the logic unblocks both ports.

Generally, if the last state variable of any blocked port was unblocked, the logic clears the topology database and generates and transmits on the unblocked port a SN-LRU topology change packet, forcing relearning of the network topology. The logic also sets the last state variable of any blocked port to blocked, and sets the last state variable of unblocked ports to unblocked.

If the network is open, the flow proceeds to Step 1150 where the logic determines for each port whether the current state variable is active or inactive and takes appropriate action. If the current state variable is active, the logic unblocks the port and sets the last state variable to unblocked. If the current state variable is inactive, the logic sets the logical break port identifier to the current port, blocks the port and, if the last state variable is unblocked, clears the topology database and transmits a SN-LRU topology change packet on the unblocked port, forcing relearning of the network topology. Finally, the logic sets the last state variable to blocked.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

The following is claimed:

1. An inflight entertainment (IFE) system, comprising:
   a plurality of head end line replaceable units (HE-LRUs); and
   a plurality of serial networking line replaceable units (SN-LRUs),
   wherein each of the SN-LRUs individually detects that a closed system network has been formed between the plurality of HE-LRUs and the plurality of SN-LRUs based on a plurality of system network packets sourced by at least one of the HE-LRUs and received on a plurality of ports of each of the SN-LRUs, and
   wherein in response to detecting that the closed system network has been formed one of the SN-LRUs blocks one of its ports based on further detecting that the one of the SN-LRUs is a middle SN-LRU based on a comparison of hops to head end values contained in the plurality of system network packets, wherein the comparison indicates a difference between the hops to head end values of no greater than one, and
   wherein each of the HE-LRUs individually detects that a closed head end network has been formed between the plurality of HE-LRUs based on an HE-LRU packet transmitted by each HE-LRU on a first port and received by each HE-LRU, respectively, on a second port, wherein in response to detecting that the closed head end network has been formed one of the HE-LRUs blocks one of its first or second port based on further detecting that the one of the HE-LRUs is a designated break LRU.

2. The system of claim 1, wherein the one of the SN-LRUs clears a topology database on the one of the SN-LRUs in response to detecting that the closed system network has been formed and based on further detecting that it is a middle SN-LRU.

3. The system of claim 1, wherein the one of the SN-LRUs transmits a topology change packet on an unblocked port of the one of the SN-LRUs in response to detecting that the closed system network has been formed and based on further detecting that it is a middle SN-LRU.

4. The system of claim 1, wherein the one of the HE-LRUs clear a topology database on the one of the HE-LRUs in response to detecting that the closed head end network has been formed and based on further detecting that it is a designated break LRU.

5. The system of claim 1, wherein the one of the HE-LRUs transmits a topology change packet on an unblocked one of its ports in response to detecting that the closed head end network has been formed and based on further detecting that it is a designated break LRU.

6. The system of claim 1, wherein the HE-LRUs comprise servers.

7. The system of claim 1, wherein the SN-LRUs are video display units (VDUs).

8. A serial networking line replaceable unit (SN-LRU) for an inflight entertainment (IFE) system having a plurality of head end line replaceable units (HE-LRUs) and a plurality of SN-LRUs, wherein each of the plurality of HE-LRUs individually detects that a closed head end network has been formed between the plurality of HE-LRUs based on an HE-LRU packet transmitted by each HE-LRU on a first port and received by each HE-LRU, respectively, on a second port, and wherein in response to detecting that the closed head end network has been formed one of the HE-LRUs blocks one of its first or second port based on further detecting that the one of the HE-LRUs is a designated break LRU, said SN-LRU comprising:
   a processor; and
   a plurality of ports communicatively coupled with the processor,
   wherein under control of the processor the SN-LRU selectively blocks one of the ports based on a comparison of a first hops to head end value contained in a first packet sourced by a first one of the plurality of HE-LRUs and received on a first one of the ports and a second hops to head end value contained in a second packet sourced by a second one of the plurality of HE-LRUs and received on a second one of the ports.

9. The SN-LRU of claim 8, wherein the SN-LRU under control of the processor blocks one of the ports only if the comparison indicates that a difference between the hops to head end values is no greater than one.

10. The SN-LRU of claim 8, wherein the SN-LRU under control of the processor blocks the one of the ports over which the packet containing the higher hops to head end value was received.

11. The SN-LRU of claim 8, wherein the SN-LRU under control of the processor selectively clears a topology database on the SN-LRU based on the comparison.

12. The SN-LRU of claim 8, wherein the SN-LRU under control of the processor selectively transmits a topology change packet on an unblocked one of the ports based on the comparison.

13. The SN-LRU of claim 8, wherein the SN-LRU is a VDU.

14. A network configuration method performed by a serial networking line replaceable unit (SN-LRU) of an inflight entertainment (IFE) system having a plurality of head end line replaceable units (HE-LRUs) and a plurality of SN-LRUs, the method comprising:
   receiving on a first port of the SN-LRU a first packet sourced by a first HE-LRU and having a first hops to head end value;
   receiving on a second port of the SN-LRU a second packet sourced by a second HE-LRU and having a second hops to head end value;
   comparing, by the SN-LRU, the first and second hops to head end values;
   selectively blocking, by the SN-LRU, one of the ports based on the comparison;
   detecting, by one of the plurality of HE-LRUs, that a closed head end network has been formed between the plurality of HE-LRUs based on an HE-LRU packet transmitted by the one of the plurality of HE-LRUs on a first port and received by the one of the plurality of HE-LRUs on a second port; and
   selectively blocking the first or second port of the one of the plurality of HE-LRUs in response to:
      detecting that the closed head end network has been formed, and
      detecting that the one of the plurality of HE-LRUs is a designated break LRU.

15. The method of claim 14, wherein selectively blocking by the SN-LRU one of the ports based on the comparison comprises blocking one of the ports only if the comparison indicates that a difference between the first and second hops to head end values is no greater than one.

16. The method of claim 14, wherein selectively blocking by the SN-LRU one of the ports based on the comparison comprises blocking the one of the ports over which the packet containing the higher hops to head end value was received.

17. The method of claim 14, further comprising selectively clearing a topology database on the SN-LRU based on the comparison.

18. The method of claim 14, further comprising selectively transmitting a topology change packet on an unblocked one of the ports based on the comparison.

* * * * *